United States Patent
Hawes et al.

(10) Patent No.: US 10,588,357 B2
(45) Date of Patent: *Mar. 17, 2020

(54) POD ASSEMBLY, DISPENSING BODY, AND E-VAPOR APPARATUS INCLUDING THE SAME

(71) Applicant: Altria Client Services LLC, Richmond, VA (US)

(72) Inventors: Eric Hawes, Midlothian, VA (US); Raymond Lau, Richmond, VA (US); Alistair Bramley, Richmond, VA (US)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,614

(22) Filed: Apr. 26, 2019

(65) Prior Publication Data
US 2019/0246700 A1     Aug. 15, 2019

Related U.S. Application Data

(63) Continuation of application No. 16/160,110, filed on Oct. 15, 2018, now Pat. No. 10,299,517, which is a (Continued)

(51) Int. Cl.
*A24F 47/00* (2006.01)
*A61M 15/06* (2006.01)
(Continued)

(52) U.S. Cl.
CPC .......... *A24F 47/008* (2013.01); *G06F 21/44* (2013.01); *H05B 1/0297* (2013.01); *H05B 3/12* (2013.01)

(58) Field of Classification Search
None
See application file for complete search history.

(56) References Cited

U.S. PATENT DOCUMENTS

D112,702 S    12/1938  Kirsten
D127,009 S     5/1941  Gebhart et al.
(Continued)

FOREIGN PATENT DOCUMENTS

CN      1575673 A    2/2005
CN    202738815 U    2/2013
(Continued)

OTHER PUBLICATIONS

United States Office Action for corresponding U.S. Appl. No. 16/166,899, dated Apr. 18, 2019.
(Continued)

*Primary Examiner* — Cynthia Szewczyk
(74) *Attorney, Agent, or Firm* — Harness, Dickey & Pierce, P.L.C.

(57) ABSTRACT

An e-vapor apparatus may include a pod assembly and a dispensing body configured to receive the pod assembly. A vaporizer may be disposed in the pod assembly and/or the dispensing body. The pod assembly may include a vapor precursor compartment, a device compartment, and a vapor channel extending from the device compartment and traversing the vapor precursor compartment. The pod assembly is a smart pod configured to receive, store, and transmit information that can be communicated with the dispensing body and/or another electronic device. The proximal portion of the dispensing body includes a vapor passage and a through-hole. The vapor passage may extend from an end surface of the proximal portion to a side wall of the through-hole. The through-hole is configured to receive the pod assembly such that the vapor channel of the pod assembly is aligned with the vapor passage of the dispensing body.

18 Claims, 14 Drawing Sheets

Related U.S. Application Data continuation of application No. 15/984,627, filed on May 21, 2018, now Pat. No. 10,117,467, which is a continuation of application No. 15/911,533, filed on Mar. 5, 2018, now Pat. No. 10,028,537, which is a continuation of application No. 14/998,020, filed on Apr. 22, 2015, now Pat. No. 10,064,432.

(51) Int. Cl.
*H05B 1/02* (2006.01)
*G06F 21/44* (2013.01)
*H05B 3/12* (2006.01)

(56) References Cited

U.S. PATENT DOCUMENTS

| | | |
|---|---|---|
| D176,226 S | 11/1955 | Morris |
| D217,841 S | 6/1970 | Bulger et al. |
| 3,986,516 A | 10/1976 | Brooks |
| 3,998,232 A | 12/1976 | Smith |
| 4,686,353 A | 8/1987 | Spector |
| D292,324 S | 10/1987 | Decker et al. |
| D301,618 S | 6/1989 | Barros |
| D317,407 S | 6/1991 | Gray et al. |
| D367,608 S | 3/1996 | Stranders |
| D368,552 S | 4/1996 | Adams |
| D373,536 S | 9/1996 | Kokenge et al. |
| 5,666,977 A | 9/1997 | Higgins et al. |
| D401,507 S | 11/1998 | Gonda et al. |
| D422,113 S | 3/2000 | Higgins et al. |
| D424,236 S | 5/2000 | Reed |
| D424,739 S | 5/2000 | Ross |
| D433,532 S | 11/2000 | Higgins et al. |
| D433,744 S | 11/2000 | Basaganas |
| D438,459 S | 3/2001 | Holthaus |
| D446,499 S | 8/2001 | Andre et al. |
| D484,806 S | 1/2004 | Cummings |
| D522,272 S | 6/2006 | Vanhee |
| D527,640 S | 9/2006 | Cummings et al. |
| D532,927 S | 11/2006 | Sann |
| D532,972 S | 12/2006 | Dixon |
| D544,956 S | 6/2007 | Collins et al. |
| D546,940 S | 7/2007 | Collins et al. |
| D547,859 S | 7/2007 | Choi |
| D552,230 S | 10/2007 | Collins et al. |
| D552,232 S | 10/2007 | Collins et al. |
| D552,730 S | 10/2007 | Collins et al. |
| D562,761 S | 2/2008 | Ueda et al. |
| D569,794 S | 5/2008 | Zhang et al. |
| D577,150 S | 9/2008 | Bryman et al. |
| D579,544 S | 10/2008 | Birath et al. |
| D579,545 S | 10/2008 | Birath et al. |
| D579,547 S | 10/2008 | Birath et al. |
| D579,549 S | 10/2008 | Birath et al. |
| D588,741 S | 3/2009 | Murdaugh, III et al. |
| 7,699,052 B2 | 4/2010 | Schiewe et al. |
| D623,129 S | 9/2010 | Kawakami et al. |
| D629,154 S | 12/2010 | Sung |
| D643,807 S | 8/2011 | Jiang |
| D649,708 S | 11/2011 | Oneil |
| D650,520 S | 12/2011 | Timmermans |
| D650,737 S | 12/2011 | Hamilton |
| D654,160 S | 2/2012 | Yomtov |
| 8,205,622 B2 | 6/2012 | Pan |
| D663,686 S | 7/2012 | Yang |
| D664,920 S | 8/2012 | Huang |
| D665,346 S | 8/2012 | Kumagai et al. |
| D665,734 S | 8/2012 | Fitch et al. |
| D672,714 S | 12/2012 | Brandys et al. |
| D682,197 S | 5/2013 | Leung |
| D683,626 S | 6/2013 | Beck et al. |
| D686,153 S | 7/2013 | Qu |
| D689,818 S | 9/2013 | Sasada |
| 8,550,069 B2 | 10/2013 | Alelov |
| D693,053 S | 11/2013 | Chen |
| D694,468 S | 11/2013 | Chen |
| 8,689,804 B2 | 4/2014 | Fernando et al. |
| 8,707,965 B2 | 4/2014 | Newton |
| D705,719 S | 5/2014 | Wong |
| 8,820,330 B2 | 9/2014 | Bellinger et al. |
| D718,492 S | 11/2014 | Albanese |
| D720,094 S | 12/2014 | Alima |
| D720,497 S | 12/2014 | Alima |
| D720,884 S | 1/2015 | Liu |
| D723,215 S | 2/2015 | Chen |
| D723,216 S | 2/2015 | Chen |
| 8,955,522 B1 | 2/2015 | Bowen et al. |
| D725,310 S | 3/2015 | Eksouzian |
| D725,588 S | 3/2015 | Iaconis et al. |
| 8,977,115 B2 | 3/2015 | Penman, Jr. |
| D727,566 S | 4/2015 | Xiao |
| D728,855 S | 5/2015 | Liu |
| D729,444 S | 5/2015 | Leidel |
| D729,445 S | 5/2015 | Leidel |
| D730,282 S | 5/2015 | Miller et al. |
| D730,572 S | 5/2015 | Leidel |
| D731,114 S | 6/2015 | Leidel |
| D733,050 S | 6/2015 | Chiang |
| D733,744 S | 7/2015 | Capela et al. |
| 9,072,321 B2 | 7/2015 | Liu |
| D736,090 S | 8/2015 | Kikuchi |
| 9,095,175 B2 | 8/2015 | Terry et al. |
| D738,038 S | 9/2015 | Smith |
| D743,099 S | 11/2015 | Oglesby |
| D748,325 S | 1/2016 | Leidel |
| D750,321 S | 2/2016 | Chen |
| 9,247,773 B2 | 2/2016 | Memari et al. |
| D751,984 S | 3/2016 | Lin |
| D752,284 S | 3/2016 | Doster |
| D752,286 S | 3/2016 | Doster |
| D753,336 S | 4/2016 | Chen |
| 9,301,545 B2 | 4/2016 | Li et al. |
| D758,004 S | 5/2016 | Freshwater et al. |
| D758,651 S | 6/2016 | Wu |
| D758,655 S | 6/2016 | Freshwater et al. |
| D758,656 S | 6/2016 | Freshwater et al. |
| D759,303 S | 6/2016 | Afridi |
| D760,429 S | 6/2016 | Emarlou |
| D760,645 S | 7/2016 | Chen |
| D760,948 S | 7/2016 | Eksouzian |
| D761,999 S | 7/2016 | Liu |
| D762,003 S | 7/2016 | Lomeli |
| D764,703 S | 8/2016 | Liu |
| D767,821 S | 9/2016 | Clark et al. |
| D768,068 S | 10/2016 | Chen |
| D769,520 S | 10/2016 | Hua |
| D770,678 S | 11/2016 | Shin |
| D771,308 S | 11/2016 | Saydar et al. |
| D771,867 S | 11/2016 | Leidel et al. |
| D772,477 S | 11/2016 | Shin |
| D772,480 S | 11/2016 | Hua |
| D773,114 S | 11/2016 | Leidel et al. |
| D773,115 S | 11/2016 | Liu |
| D773,116 S | 11/2016 | Liu et al. |
| D774,247 S | 12/2016 | Chen |
| D775,414 S | 12/2016 | Ampolini et al. |
| D775,762 S | 1/2017 | Chen |
| D776,337 S | 1/2017 | Levin et al. |
| D776,338 S | 1/2017 | Lomeli |
| D776,869 S | 1/2017 | Heidl |
| D778,492 S | 2/2017 | Liu |
| D778,493 S | 2/2017 | Scott |
| D779,719 S | 2/2017 | Qiu |
| D780,373 S | 2/2017 | Bennett et al. |
| D784,610 S | 4/2017 | Bosch |
| D786,497 S | 5/2017 | Sudlow et al. |
| D788,362 S | 5/2017 | Qiu |
| D788,364 S | 5/2017 | Chen |
| D788,697 S | 6/2017 | Verleur et al. |
| D790,123 S | 6/2017 | Beer et al. |
| D790,766 S | 6/2017 | Li |
| D792,020 S | 7/2017 | Mendoza |
| D792,021 S | 7/2017 | Beer et al. |
| D792,643 S | 7/2017 | Wong et al. |

(56) References Cited

U.S. PATENT DOCUMENTS

| | | |
|---|---|---|
| D792,644 S | 7/2017 | Jordan et al. |
| D796,112 S | 8/2017 | Lafferty et al. |
| D799,110 S | 10/2017 | Qiu |
| D799,111 S | 10/2017 | Qiu |
| D799,112 S | 10/2017 | Qiu |
| D799,113 S | 10/2017 | Qiu |
| D799,743 S | 10/2017 | Qiu |
| D799,744 S | 10/2017 | Qiu |
| D799,746 S | 10/2017 | Leidel et al. |
| D799,748 S | 10/2017 | Freese |
| D799,749 S | 10/2017 | Freese |
| D800,377 S | 10/2017 | Liu |
| D801,507 S | 10/2017 | Kelnhofer |
| D802,834 S | 11/2017 | Mathias et al. |
| D802,839 S | 11/2017 | Scott |
| 9,814,271 B2 | 11/2017 | Goggin et al. |
| D805,685 S | 12/2017 | Lee |
| 9,833,021 B2 | 12/2017 | Perez et al. |
| D806,943 S | 1/2018 | Liu et al. |
| D807,286 S | 1/2018 | Qiu |
| D807,576 S | 1/2018 | Liu et al. |
| D807,577 S | 1/2018 | Ward et al. |
| D807,818 S | 1/2018 | Mathias et al. |
| D808,071 S | 1/2018 | Folkerts et al. |
| D808,073 S | 1/2018 | Leidel |
| D808,791 S | 1/2018 | Johnston et al. |
| D808,792 S | 1/2018 | Jaggi et al. |
| D809,191 S | 1/2018 | Li |
| D809,192 S | 1/2018 | Liu et al. |
| D814,693 S | 4/2018 | Qiu |
| D815,347 S | 4/2018 | Jones et al. |
| D818,636 S | 5/2018 | Qiu |
| 9,961,940 B2 | 5/2018 | Anderson, Jr. et al. |
| 9,968,136 B1 | 5/2018 | Bell |
| D819,880 S | 6/2018 | Qiu |
| D819,882 S | 6/2018 | Qiu |
| D821,639 S | 6/2018 | Dai et al. |
| D821,640 S | 6/2018 | Qiu |
| D824,096 S | 7/2018 | Qiu |
| D828,953 S | 9/2018 | Chen |
| D836,831 S | 12/2018 | Cividi |
| 2005/0016550 A1 | 1/2005 | Katase |
| 2005/0268911 A1 | 12/2005 | Cross et al. |
| 2008/0023003 A1 | 1/2008 | Rosenthal |
| 2008/0092912 A1 | 4/2008 | Robinson et al. |
| 2009/0266358 A1 | 10/2009 | Sacristan Rock et al. |
| 2009/0293888 A1 | 12/2009 | Williams et al. |
| 2011/0011396 A1 | 1/2011 | Fang |
| 2011/0036346 A1 | 2/2011 | Cohen et al. |
| 2011/0265806 A1 | 11/2011 | Alarcon et al. |
| 2011/0277760 A1 | 11/2011 | Terry et al. |
| 2012/0174914 A1 | 7/2012 | Pirshafiey et al. |
| 2012/0318882 A1 | 12/2012 | Abehasera |
| 2013/0042865 A1 | 2/2013 | Monsees et al. |
| 2013/0081642 A1 | 4/2013 | Safari |
| 2013/0087160 A1 | 4/2013 | Gherghe |
| 2013/0167853 A1 | 7/2013 | Liu |
| 2013/0182360 A1 | 7/2013 | Stevens et al. |
| 2013/0192615 A1 | 8/2013 | Tucker et al. |
| 2013/0213418 A1 | 8/2013 | Tucker et al. |
| 2013/0220315 A1 | 8/2013 | Conley et al. |
| 2013/0284192 A1 | 10/2013 | Peleg et al. |
| 2013/0298905 A1 | 11/2013 | Levin et al. |
| 2013/0327327 A1 | 12/2013 | Edwards et al. |
| 2013/0340775 A1 | 12/2013 | Juster et al. |
| 2013/0341218 A1 | 12/2013 | Liu |
| 2014/0007891 A1 | 1/2014 | Liu |
| 2014/0096781 A1 | 4/2014 | Sears et al. |
| 2014/0096782 A1 | 4/2014 | Ampolini et al. |
| 2014/0107815 A1 | 4/2014 | LaMothe |
| 2014/0123989 A1 | 5/2014 | LaMothe |
| 2014/0123990 A1 | 5/2014 | Timmermans |
| 2014/0144453 A1 | 5/2014 | Capuano et al. |
| 2014/0150785 A1 | 6/2014 | Malik et al. |
| 2014/0157583 A1 | 6/2014 | Ward et al. |
| 2014/0174459 A1 | 6/2014 | Burstyn |
| 2014/0190830 A1 | 7/2014 | Sturmer et al. |
| 2014/0202474 A1 | 7/2014 | Peleg et al. |
| 2014/0224267 A1 | 8/2014 | Levitz et al. |
| 2014/0246035 A1 | 9/2014 | Minskoff et al. |
| 2014/0251326 A1 | 9/2014 | Terry et al. |
| 2014/0253144 A1 | 9/2014 | Novak, III et al. |
| 2014/0261408 A1 | 9/2014 | DePiano et al. |
| 2014/0261495 A1 | 9/2014 | Novak, III et al. |
| 2014/0270727 A1 | 9/2014 | Ampolini et al. |
| 2014/0270730 A1 | 9/2014 | DePiano et al. |
| 2014/0299137 A1 | 10/2014 | Kieckbusch et al. |
| 2014/0299141 A1 | 10/2014 | Flick |
| 2014/0338685 A1 | 11/2014 | Amir |
| 2014/0345635 A1 | 11/2014 | Rabinowitz et al. |
| 2014/0360517 A1 | 12/2014 | Taggart et al. |
| 2014/0378790 A1 | 12/2014 | Cohen |
| 2015/0027455 A1 | 1/2015 | Peleg et al. |
| 2015/0040929 A1 | 2/2015 | Hon |
| 2015/0053217 A1 | 2/2015 | Steingraber et al. |
| 2015/0075546 A1 | 3/2015 | Kueny, Sr. et al. |
| 2015/0082859 A1 | 3/2015 | Xiang |
| 2015/0108019 A1 | 4/2015 | Liu |
| 2015/0114410 A1 | 4/2015 | Doster |
| 2015/0128967 A1 | 5/2015 | Robinson et al. |
| 2015/0128971 A1 | 5/2015 | Verleur et al. |
| 2015/0136158 A1 | 5/2015 | Stevens et al. |
| 2015/0142387 A1 | 5/2015 | Alarcon et al. |
| 2015/0164430 A1 | 6/2015 | Hu et al. |
| 2015/0189919 A1 | 7/2015 | Liu |
| 2015/0208729 A1 | 7/2015 | Monsees et al. |
| 2015/0237917 A1 | 8/2015 | Lord |
| 2015/0237918 A1 | 8/2015 | Liu |
| 2015/0257445 A1 | 9/2015 | Henry, Jr. et al. |
| 2015/0282527 A1 | 10/2015 | Henry, Jr. |
| 2015/0313287 A1 | 11/2015 | Verleur et al. |
| 2015/0320116 A1 | 11/2015 | Bleloch et al. |
| 2015/0328415 A1 | 11/2015 | Minskoff et al. |
| 2015/0351456 A1 | 12/2015 | Johnson et al. |
| 2015/0374039 A1 | 12/2015 | Zhu |
| 2016/0000149 A1 | 1/2016 | Scatterday |
| 2016/0029698 A1 | 2/2016 | Xiang |
| 2016/0120218 A1 | 5/2016 | Schennum et al. |
| 2016/0158782 A1 | 6/2016 | Henry, Jr. et al. |
| 2016/0345626 A1 | 12/2016 | Wong et al. |
| 2017/0006918 A1 | 1/2017 | Chen et al. |
| 2017/0119044 A1 | 5/2017 | Oligschlaeger et al. |
| 2017/0208863 A1 | 7/2017 | Davis et al. |
| 2017/0208864 A1 | 7/2017 | Anderson, Jr. et al. |
| 2017/0215478 A1 | 8/2017 | Harrison et al. |
| 2017/0245550 A1 | 8/2017 | Freelander |
| 2017/0290371 A1 | 10/2017 | Davis et al. |
| 2017/0360092 A1 | 12/2017 | Althorpe et al. |
| 2017/0360098 A1 | 12/2017 | Newcomb et al. |
| 2017/0367406 A1 | 12/2017 | Schuler et al. |
| 2017/0367407 A1 | 12/2017 | Althorpe et al. |
| 2017/0369219 A1 | 12/2017 | Bailey et al. |
| 2018/0007954 A1 | 1/2018 | Mishra et al. |
| 2018/0007967 A1 | 1/2018 | Davis et al. |
| 2018/0013175 A1 | 1/2018 | Liu |
| 2018/0020738 A1 | 1/2018 | Qiu |
| 2018/0035715 A1 | 2/2018 | Wu |
| 2018/0070638 A1 | 3/2018 | Qiu |
| 2018/0084828 A1 | 3/2018 | Phillips et al. |
| 2018/0084836 A1 | 3/2018 | Perez et al. |
| 2018/0098571 A1 | 4/2018 | Watson |
| 2018/0110943 A1 | 4/2018 | Raichman |
| 2018/0116281 A1 | 5/2018 | Anderson, Jr. |
| 2018/0132526 A1 | 5/2018 | Davis et al. |
| 2018/0153219 A1 | 6/2018 | Verleur et al. |
| 2018/0160739 A1 | 6/2018 | Chen |
| 2018/0166238 A1 | 6/2018 | Chen |

FOREIGN PATENT DOCUMENTS

| | | |
|---|---|---|
| CN | 203828071 U | 9/2014 |
| CN | 203841122 U | 9/2014 |
| CN | 203986106 U | 12/2014 |
| CN | 204104844 U | 1/2015 |

(56) References Cited

FOREIGN PATENT DOCUMENTS

| | | |
|---|---|---|
| CN | 104432537 A | 3/2015 |
| CN | 204234255 U | 4/2015 |
| CN | 106820274 A | 6/2017 |
| CN | 303417607 S | 6/2017 |
| CN | 206413749 U | 8/2017 |
| EA | EU-002337410-00 | 11/2013 |
| EP | 0640297 A1 | 3/1995 |
| GB | 2502164 A | 11/2013 |
| JP | 1584539 S | 8/2017 |
| KR | 101465034 B1 | 11/2014 |
| RU | 00104198 | 7/2017 |
| WO | WO-2013040193 A2 | 3/2013 |
| WO | WO-2014/060267 A2 | 4/2014 |
| WO | WO-2014/060269 A1 | 4/2014 |
| WO | WO-2014/066730 A1 | 5/2014 |
| WO | WO-2014/095737 A1 | 6/2014 |
| WO | WO-2014/110119 A1 | 7/2014 |
| WO | WO-2014/125483 A1 | 8/2014 |
| WO | WO-2014-144678 A2 | 9/2014 |
| WO | WO-2014207719 A1 | 12/2014 |
| WO | WO-2015031836 A1 | 3/2015 |
| WO | WO-2015052513 A2 | 4/2015 |
| WO | WO-2015/077645 A1 | 5/2015 |
| WO | WO-2015/131991 A1 | 9/2015 |
| WO | WO-2015/189556 A1 | 12/2015 |
| WO | WO-2015/197165 A1 | 12/2015 |
| WO | WO-2016/100368 A1 | 6/2016 |

OTHER PUBLICATIONS

Office Action for corresponding Eurasian Application No. 201792097 dated Apr. 23, 2019 and English translation thereof.
United States Notice of Allowance for corresponding U.S. Appl. No. 16/166,899 dated Jul. 10, 2019.
United States Notice of Allowance for corresponding U.S. Appl. No. 16/111,468 dated Jul. 10, 2019.
United States Notice of Allowance for corresponding U.S. Appl. No. 29/575,881 dated Jul. 17, 2019.
Examination Report for European Application No. 16 721 308.1 dated Jul. 9, 2019.
Eurasian Office Action for corresponding Application No. 201792097 dated May 7, 2019, English translation thereof.
Smokio, http://www.premiumlifestyle.co.uk/products/smokio-smart-wireless-e-cigarette, 2014.
Go Electronic Cigarette, "Igo 4Electronic Cigarette," http://www.electronic-cigarette.ie/Charger-iGO4, Feb. 19, 2015.
International Search Report and Written Opinion dated Jul. 19, 2016.
International Preliminary Report on Patentability dated Oct. 24, 2017.
Parate, "Designing Efficient and Accurate Behavior-Aware Mobile Systems," Doctoral Dissertations, University of Massachusetts-Amherst, 2014.
International Search Report and Written Opinion dated Mar. 29, 2018.
Office Action for U.S. Appl. No. 15/135,932 dated Mar. 14, 2018.
Office Action for U.S. Appl. No. 15/135,932 dated Sep. 18, 2018.
Notice of Allowance for U.S. Appl. No. 15/135,932 dated Feb. 26, 2019.
Web address http://www.my7s.com/faq, 7's electronic cigarettes, Electronic Vapor.
International Search Report dated Jun. 23, 2016, issued in corresponding International Application No. PCT/US2016/028048.
Written Opinion of the International Searching Authority dated Jun. 23, 2016, issued in corresponding International Application No. PCT/US2016/028048.
U.S. Office Action dated Jun. 5, 2017 for copending U.S. Appl. No. 14/998,020.
Viva—retrieved on Sep. 18, 2017 at https://cdn.shopify.com/s/files/1/1203/8500/products/viva-vaporizer-01_large.jpg?v=1480032844.
ALD—retrived Sep. 18, 2017 at https://ae01.alicdn.com/kf/HTB1gMOmPFXXXXbdXpXXq6xXFXXXR/ALD-AMAZE-dry-herb-vaporizer-font-b-kit-b-font-smoke-herbal-electronic-cigarette-vaporizer-portable.jpg.
Internation Search Report and Written Opinion for Application No. PCT/US2016/028048 dated Nov. 2, 2017.
International Search Report and Written Opinion for Application No. PCT/US2016/028048 dated Nov. 2, 2017.
Office Action for corresponding U.S. Appl. No. 14/998,020 dated Dec. 21, 2017.
Office Action for corresponding U.S. Appl. No. 15/334,989 dated Feb. 23, 2018.
Notice of Allowance for corresponding U.S. Appl. No. 15/601,365 dated Mar. 2, 2018.
VaporDNA by VaporDNA dated 2013-2018, found online https://www.vapordna.com/SMPO-Ultra-Portable-Kit-p/smpoup.htm?Click=40939.
Vype Bye Electronic Tobacconist dated 2018, found online https://www.electrictobacconist.co.uk/vype-pebble-p7009.
Notice of Allowance for corresponding U.S. Appl. No. 29/575,887 dated May 3, 2018.
Notice of Allowance for corresponding U.S. Appl. No. 29/575,883 dated May 3, 2018.
Notice of Allowance for corresponding U.S. Appl. No. 15/911,533 dated May 8, 2018.
Non-Final Office Action for corresponding U.S. Appl. No. 15/984,627 dated Jul. 12, 2018.
Notice of Allowance for corresponding U.S. Appl. No. 29/623,426 dated Jul. 19, 2018.
Notice of Allowance for corresponding U.S. Appl. No. 29/623,423 dated Jul. 24, 2018.
Office Action for corresponding U.S. Appl. No. 16/010,934 dated Aug. 7, 2018.
Notice of Allowance dated Aug. 29, 2018 issued in corresponding U.S. Appl. No. 29/575,881.
Office Action dated Sep. 11, 2018 issued in corresponding U.S. Appl. No. 29/575,895.
U.S. Office Action dated Sep. 11, 2018 issued in co-pending U.S. Appl. No. 29/575,895.
U.S. Office Action dated Oct. 4, 2018 for co-pending U.S. Appl. No. 16/111,468.
European Office Action issued Oct. 10, 2018 in corresponding Application No. 18178672.4.
U.S. Office Action dated Dec. 13, 2018 for corresponding U.S. Appl. No. 15/160,110.
U.S. Office Action dated Dec. 13, 2018 issued in co-pending U.S. Appl. No. 16/160,110.
Office Action for corresponding U.S. Appl. No. 29/575,881 dated Feb. 25, 2019.
U.S. Office Action for corresponding U.S. Appl. No. 29/575,895 dated Mar. 1, 2019.
Notice of Allowance for U.S. Appl. No. 16/111,468 dated Apr. 18, 2019.
Notice of Allowance for U.S. Appl. No. 29/670,492 dated Sep. 30, 2019.
Chinese Office Action dated Oct. 11, 2019 for corresponding Chinese Application No. 201680023188.9.
Chinese Office Action for corresponding Application No. 201680023188.9, dated Oct. 11, 2019, English translation thereof.

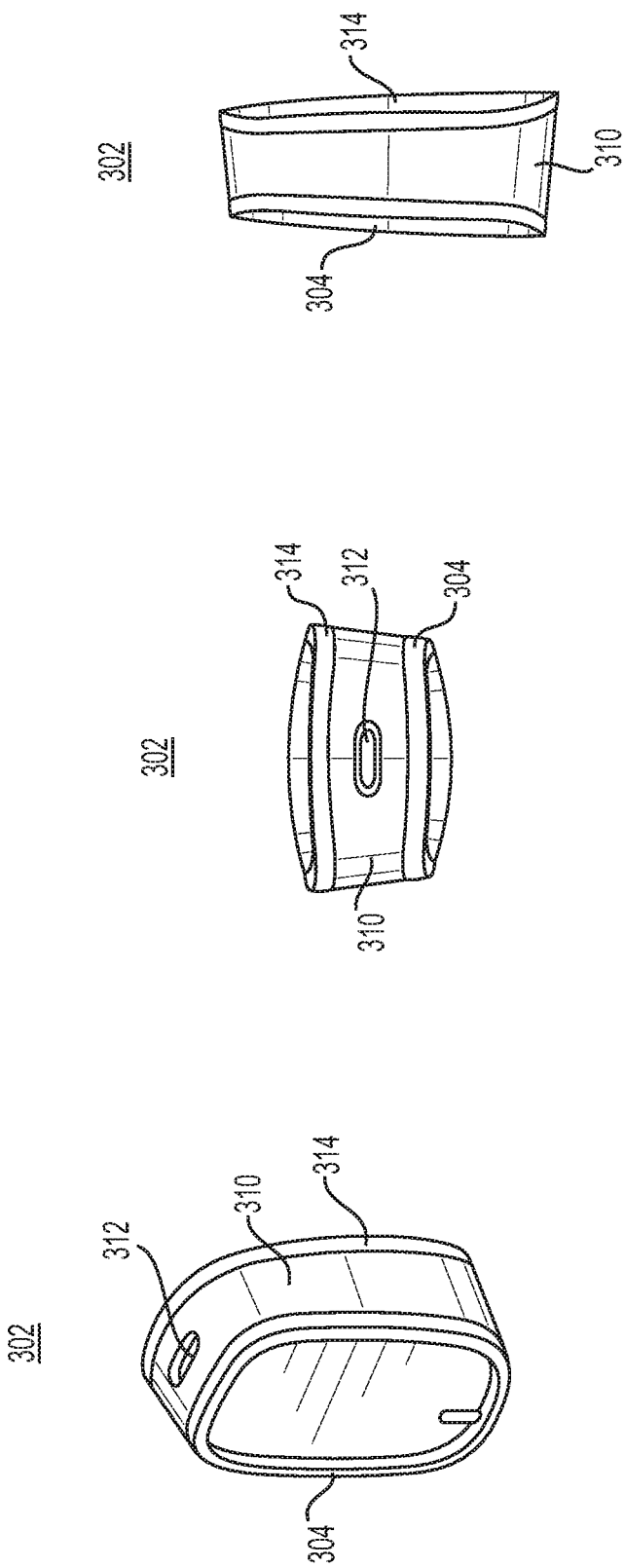

POD ASSEMBLY, DISPENSING BODY, AND E-VAPOR APPARATUS INCLUDING THE SAME

CROSS-REFERENCE TO RELATED APPLICATIONS

The present application is a continuation under 35 U.S.C. § 120 of U.S. application Ser. No. 16/160,110, filed Oct. 15, 2018, which is a continuation under 35 U.S.C. § 120 of U.S. application Ser. No. 15/984,627, filed May 21, 2018, now U.S. Pat. No. 10,117,467, which is a continuation under 35 U.S.C. § 120 of U.S. application Ser. No. 15/911,533, filed Mar. 5, 2018, now U.S. Pat. No. 10,028,537, which is a continuation under 35 U.S.C. § 120 of U.S. application Ser. No. 14/998,020 (formerly U.S. Provisional Application No. 62/151,148), filed Apr. 22, 2015, now U.S. Pat. No. 10,064,432, the entire contents of each of which is hereby incorporated herein by reference.

BACKGROUND

Field

The present disclosure relates to electronic vapor devices including self-contained articles including vapor precursors.

Description of Related Art

Some e-vapor devices include a first section coupled to a second section via a threaded connection. The first section may be a replaceable cartridge, and the second section may be a reusable fixture. The threaded connection may be a combination of a male threaded member on the first section and a female threaded receiver on the second section. The first section includes an outer tube (or housing) extending in a longitudinal direction and an inner tube within the outer tube. The inner tube may be coaxially positioned within the outer tube. The second section may also include the outer tube (or housing) extending in a longitudinal direction. The e-vapor device includes a central air passage defined in part by the inner tube and an upstream seal. Additionally, the e-vapor device includes a reservoir. The reservoir is configured to hold a vapor precursor and optionally a storage medium operable to store the vapor precursor therein. The reservoir is contained in an outer annulus between the outer tube and the inner tube. The outer annulus is sealed by the seal at an upstream end and by a stopper at a downstream end so as to prevent leakage of the vapor precursor from the reservoir.

SUMMARY

An e-vapor apparatus may include a pod assembly, a dispensing body configured to receive the pod assembly, and/or a vaporizer disposed in at least one of the pod assembly and the dispensing body. The pod assembly may include a vapor precursor compartment, a device compartment, and a vapor channel extending from the device compartment and traversing the vapor precursor compartment. The vapor precursor compartment is configured to hold a vapor precursor therein. The dispensing body includes a proximal portion and an opposing distal portion. The proximal portion includes a vapor passage and a through-hole. The vapor passage may extend from an end surface of the proximal portion to a side wall of the through-hole. The through-hole may be between the vapor passage and the distal portion of the dispensing body. The through-hole is configured to receive the pod assembly. The vaporizer may be disposed in at least one of the pod assembly and the dispensing body. The vapor precursor compartment of the pod assembly is configured to be in fluidic communication with the vaporizer during an operation of the e-vapor apparatus such that the vapor precursor from the vapor precursor compartment comes into thermal contact with the vaporizer. The vaporizer is configured to heat the vapor precursor to produce a vapor that passes through the pod assembly via the vapor channel. The through-hole of the dispensing body is configured to receive the pod assembly such that the vapor channel of the pod assembly is aligned with the vapor passage of the dispensing body so as to facilitate a delivery of the vapor through the vapor passage of the dispensing body.

The vapor precursor compartment of the pod assembly may surround the vapor channel. For example, the vapor channel may pass through a center of the vapor precursor compartment.

Alternatively, the vapor channel may be in a form of a pathway that is arranged along at least one sidewall of the vapor precursor compartment. For example, the vapor channel may be in a form of a conduit that is arranged in at least one corner of the vapor precursor compartment. The conduit may be arranged in at least two corners of the vapor precursor compartment and configured to converge at a position that is aligned with the vapor passage of the dispensing body when the pod assembly is received in the through-hole.

The vapor precursor compartment and the device compartment may be at opposite ends of the pod assembly. The device compartment of the pod assembly may include a memory device. The memory device may be coded with an electronic identity to permit at least one of an authentication of the pod assembly and a pairing of operating parameters specific to a type of the pod assembly when the pod assembly is inserted into the through-hole of the dispensing body. The memory device may also receive and store information such as operational parameters and usage history from the dispensing body. Once stored, such information in the memory device will remain intact even when the pod is detached from the dispensing body.

The pod assembly may include a side surface having at least one electrical contact. The dispensing body may be configured to perform at least one of supply power to and communicate with the pod assembly via the at least one electrical contact. The at least one electrical contact may be at an end of the pod assembly corresponding to the device compartment.

The dimensions of the through-hole correspond to dimensions of the pod assembly. The proximal portion of the dispensing body may include a mouthpiece that includes the vapor passage. The vapor channel may be between the mouthpiece and the device compartment when the pod assembly is inserted into the through-hole of the dispensing body. The e-vapor apparatus may further include an attachment structure on at least one of the side wall of the through-hole and a side surface of the pod assembly. The attachment structure is configured to engage and hold the pod assembly upon insertion into the through-hole of the dispensing body. The attachment structure enables the pod assembly to be inserted and extracted from the dispensing body by the adult vaper with ease. The attachment structure also aligns and secures the pod assembly in place in the dispensing body during normal use of the e-vapor apparatus.

A pod assembly for an e-vapor apparatus may include a vapor precursor compartment configured to hold a vapor precursor therein; a device compartment in fluidic communication with the vapor precursor compartment; and a vapor channel extending from the device compartment and traversing the vapor precursor compartment. The device compartment may include a vaporizer. The device compartment may also include a memory device. A side surface of the pod assembly may include at least one electrical contact.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

FIG. 15 is a perspective view of a pod assembly of an e-vapor apparatus according to an example embodiment.

FIG. 16 is a top view of the pod assembly of FIG. 15.

FIG. 17 is a side view of the pod assembly of FIG. 15.

DETAILED DESCRIPTION

Figure 1:
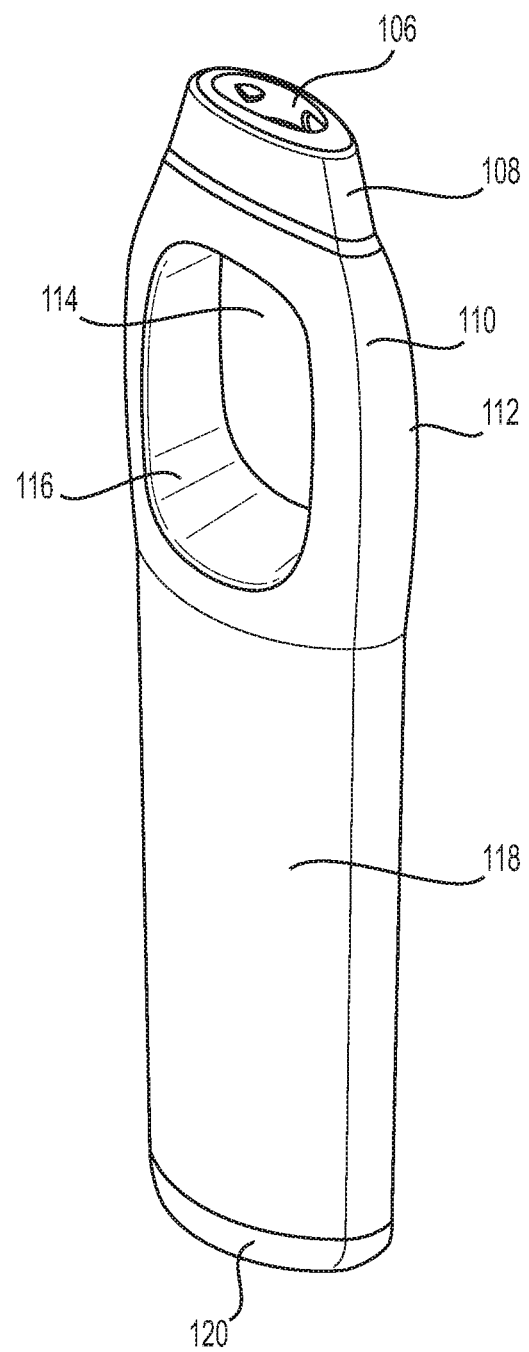
FIG. 1 is a perspective view of a dispensing body of an e-vapor apparatus according to an example embodiment.

It should be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It should be understood that, although the terms first, second, third, etc. may be used herein to describe various elements, components, regions, layers and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of example embodiments.

Spatially relative terms (e.g., "beneath," "below," "lower," "above," "upper," and the like) may be used herein for ease of description to describe one element or feature's relationship to another element(s) or feature(s) as illustrated in the figures. It should be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

FIG. 1 is a perspective view of a dispensing body of an e-vapor apparatus according to an example embodiment. Referring to FIG. 1, a dispensing body 104 of an e-vapor apparatus includes a frame portion that is connected to a body portion 118. The frame portion includes a first frame 110 and a second frame 112. The side walls 116 (e.g., inner side surfaces) of the first frame 110 and the second frame 112 define a through-hole 114. The through-hole 114 is configured to receive a pod assembly (which will be subsequently discussed in detail).

Generally, an e-vapor apparatus may include the dispensing body 104, a pod assembly inserted in the through-hole 114 of the dispensing body 104, and a vaporizer disposed in at least one of the pod assembly and the dispensing body 104. The pod assembly may include a vapor precursor compartment (e.g., liquid compartment), a device compartment, and a vapor channel. The vapor channel may extend from the device compartment and traverse the vapor precursor compartment. The vapor precursor compartment is configured to hold a vapor precursor (e.g., e-liquid) therein. A vapor precursor is a material or combination of materials that may be transformed into a vapor. For example, the vapor precursor may be a liquid, solid, and/or gel formulation including, but not limited to, water, beads, solvents, active ingredients, ethanol, plant extracts, natural or artificial flavors, and/or vapor formers such as glycerine and propylene glycol.

The dispensing body 104 includes a proximal portion and an opposing distal portion. The mouthpiece 108 is disposed at the proximal portion, while the end piece 120 is disposed at the distal portion. The proximal portion includes a vapor passage 106 and the through-hole 114. The vapor passage 106 extends from an end surface of the proximal portion to the side wall 116 of the through-hole 114. The vapor passage 106 is in the form of one or more passageways extending through the proximal portion of the dispensing body 104. The through-hole 114 is between the vapor passage 106 and the distal portion of the dispensing body 104 (e.g., between the mouthpiece 108 and the body portion 118).

A vaporizer (which will be subsequently discussed in more detail) is disposed in at least one of the pod assembly and the dispensing body 104. The vapor precursor compartment of the pod assembly is configured to be in fluidic communication with the vaporizer during an operation of the e-vapor apparatus such that the vapor precursor from the vapor precursor compartment comes into thermal contact with the vaporizer. The vaporizer is configured to heat the vapor precursor to produce a vapor that passes through the pod assembly via the vapor channel. The through-hole 114 of the dispensing body 104 is configured to receive the pod assembly such that the vapor channel of the pod assembly is aligned with the vapor passage 106 of the dispensing body 104 so as to facilitate a delivery of the vapor through the vapor passage 106 of the dispensing body 104.

Figure 2:
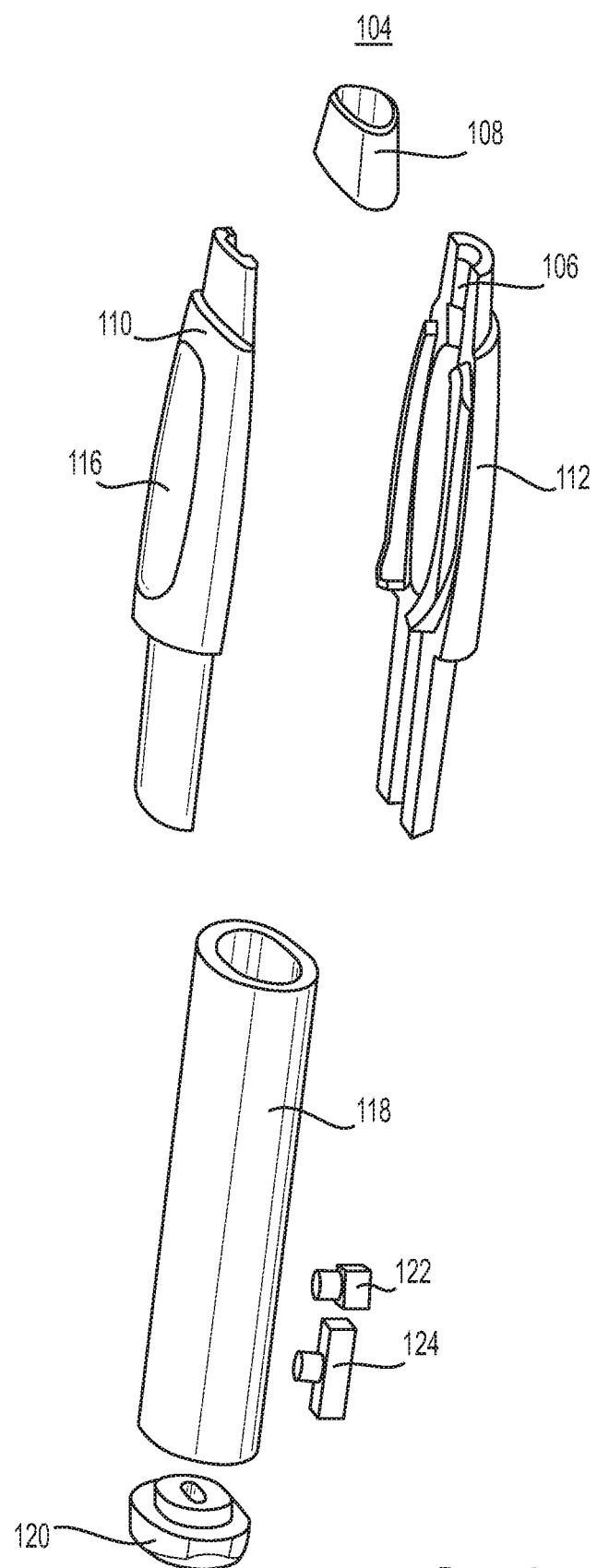
FIG. 2 is an exploded view of the dispensing body of FIG. 1.

FIG. 2 is an exploded view of the dispensing body of FIG. 1. Referring to FIG. 2, the first frame 110 and the second frame 112 are configured to unite to form the frame portion of the dispensing body 104. A number of options are available for uniting the first frame 110 and the second frame 112. In an example embodiment, the first frame 110 is a female member, while the second frame 112 is a male member that is configured to engage therewith. Alternatively, the first frame 110 may be a male member, while the second frame 112 may be a female member that is configured to engage therewith. The engagement of the first frame 110 and the second frame 112 may be via a snap-fit, friction-fit, or slide-lock type arrangement, although example embodiments are not limited thereto.

The first frame 110 may be regarded as the front frame of the dispensing body 104, and the second frame 112 may be regarded as the rear frame (or vice versa). Additionally, the proximal ends of the first frame 110 and the second frame 112, when united, define the vapor passage 106 therebetween. The vapor passage 106 may be in the form of a single passageway that is in communication with the through-hole 114 defined by the side wall 116. Alternatively, the vapor passage 106 may be in the form of a plurality of passageways that are in communication with the through-hole 114 defined by the side wall 116. In such an example, the plurality of passageways may include a central passageway surrounded by peripheral passageways (or just several evenly spaced passageways). Each of the plurality of passageways may independently extend from the through-hole 114 to the proximal end surface of the frame portion. Alternatively, a common passageway may extend partly from the through-hole 114 and then branch into a plurality of passageways that extend to the proximal end surface of the frame portion.

The mouthpiece 108 is configured to slip onto the proximal end of the frame portion that defines the vapor passage 106. As a result, the outer surface of the proximal end formed by the first frame 110 and the second frame 112 may correspond to an inner surface of the mouthpiece 108. Alternatively, the proximal end defining the vapor passage 106 may be integrally formed as part of the mouthpiece 108 (instead of being a part of the frame portion). The mouthpiece 108 may be secured via a snap-fit type or other suitable arrangement. In an example embodiment, the mouthpiece 108 is a removable component that is intended to permit voluntary, recommended, or required replacement by an adult vaper. For instance, the mouthpiece 108 may, in addition to its intended functionality, provide a visual or other sensory appeal to the adult vaper. In particular, the mouthpiece 108 may be formed of an ornamental material (e.g., wood, metal, ceramic) and/or include designs (e.g., patterns, images, characters). Thus, the mouthpiece 108 may be customized so as to provide an expression of personality and individuality by an adult vaper. In other instances, the removable nature of the mouthpiece 108 may facilitate a recommended replacement due to the amount of usage or a required replacement due to wear over time or damage (e.g., chipped mouthpiece 108 caused by accidental dropping of e-vapor apparatus).

The lower ends of the first frame 110 and the second frame 112 opposite the proximal ends (that define the vapor passage 106) are configured to insert into the body portion 118. To facilitate a secure fit, the outer surface of the lower ends of the first frame 110 and the second frame 112 may correspond to a receiving inner surface of the body portion 118. Additionally, the lower ends of the first frame 110 and the second frame 112 may also define a groove therebetween to accommodate one or more wires that connect to one or more electrical contacts provided in the side wall 116 (e.g., lower surface of the side wall 116 opposite the vapor passage 106). A power source (e.g., battery) may also be provided in the groove to supply the requisite current through the wire(s). Alternatively, the power source may be provided in an available space within the body portion 118 between the inserted lower end of the frame portion and the end piece 120.

A first button 122 and a second button 124 may be provided on the body portion 118 and connected to the corresponding circuitry and electronics therein. In an example embodiment, the first button 122 may be a power button, and the second button 124 may be a battery level indicator. The battery level indicator may display a representation of the amount of power available (e.g., 3 out of 4 bars). In addition, the battery level indicator may also blink and/or change colors to alert an adult vaper to recharge the e-vapor apparatus. To stop the blinking, an adult vaper may simply press the second button 124. Thus, the button(s) of the e-vapor apparatus may have a control and/or display function. It should be understood that the examples with regard to the first button 122 and the second button 124 are not intended to be limiting and can have different implementations depending on the desired functionalities. Accordingly, more than two buttons (and/or of different shapes) may be provided in the same proximity or at a different location on the e-vapor apparatus.

Figure 3:
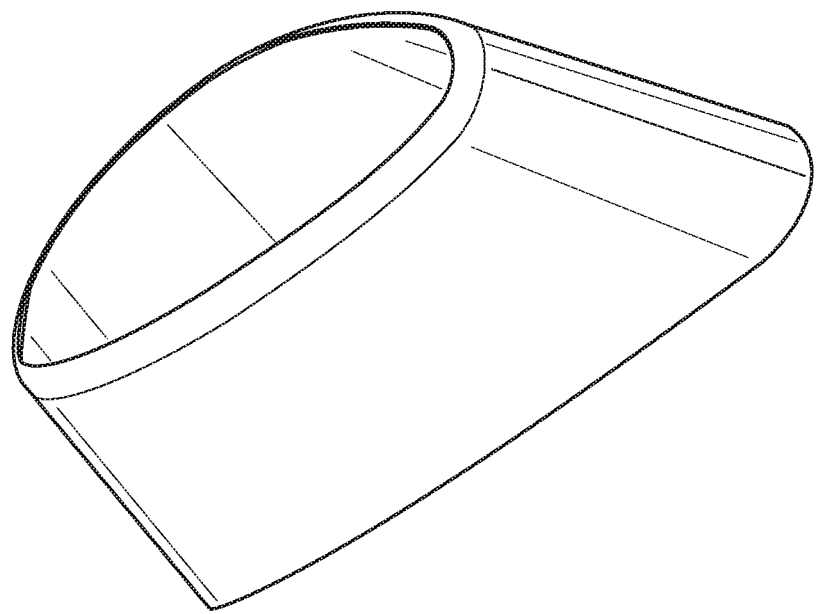
FIG. 3 is a perspective view of the mouthpiece of FIG. 2.

FIG. 3 is a perspective view of the mouthpiece of FIG. 2. Referring to FIG. 3, the mouthpiece 108 may be an open-ended cap-like structure that is configured to slip onto the proximal end of the frame portion defining the vapor passage 106. The mouthpiece 108 may have a wider base that tapers to a narrower top. However, it should be understood that example embodiments are not limited thereto. The mouthpiece 108 may also be shaped to better accommodate an adult vaper's mouth during inhalation of the vapor. For instance, one side of the mouthpiece 108 may be more linear, while the opposing side may be more curved.

Figure 4:
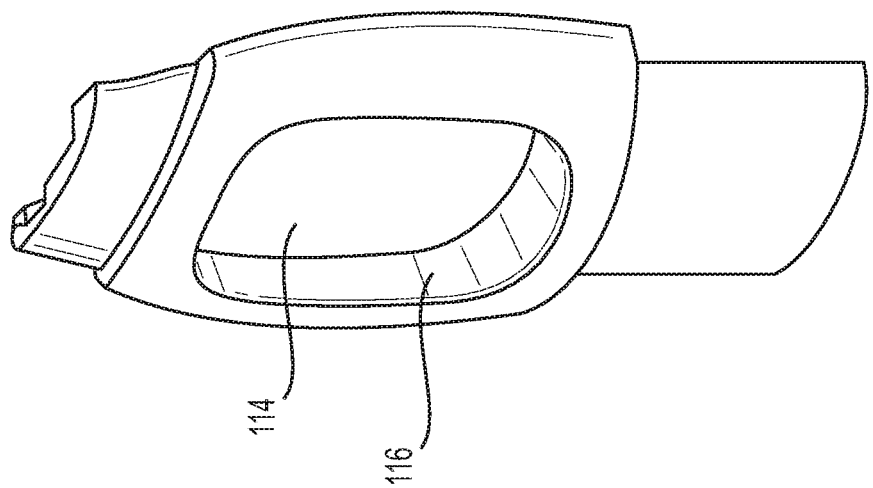
FIG. 4 is a perspective view of the first frame of FIG. 2.

FIG. 4 is a perspective view of the first frame of FIG. 2. Referring to FIG. 4, the first frame 110 includes a side wall 116 that defines a through-hole 114. The first frame 110 is configured to unite with the second frame 112, which also includes a side wall 116 defining a through-hole 114. Because the combined through-hole 114 is configured to receive a pod assembly, the side walls 116 of the first frame 110 and the second frame 112 may form a relatively smooth and continuous surface to facilitate the insertion of the pod assembly.

Figure 5:
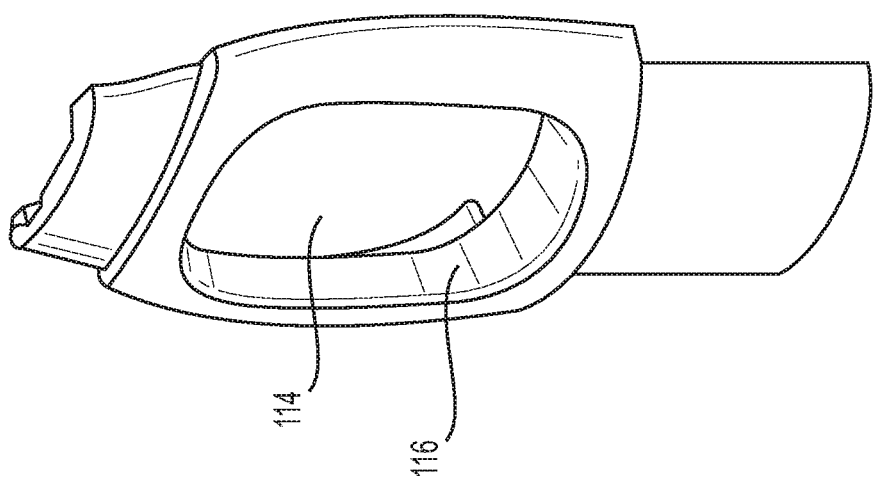
FIG. 5 is a perspective view of the second frame of FIG. 2.

FIG. 5 is a perspective view of the second frame of FIG. 2. Referring to FIG. 5, the second frame 112 is configured to unite with the first frame 110 such that the shape defined by the combined side walls 116 corresponds to the shape of the side surface of a pod assembly. In addition, an attachment structure (e.g., mating member/recess, magnetic arrangement) may be provided on at least one of the side walls 116 and the side surface of the pod assembly.

For example, the attachment structure may include a mating member that is formed on the side wall 116 (of the first frame 110 and/or second frame 112) and a corresponding recess that is formed on the side surface of the pod assembly. Conversely, the mating member may be formed on the side surface of the pod assembly, while the corresponding recess may be formed on the side wall 116 (of the first frame 110 and/or second frame 112). In a non-limiting embodiment, the mating member may be a rounded structure to facilitate the engagement/disengagement of the attachment structure, while the recess may be a concave indentation that corresponds to the curvature of the rounded structure. The mating member may also be spring-loaded so as to retract (via spring compression) when the pod assembly is being inserted into the through-hole 114 and protract (via spring decompression) when mating member becomes aligned with the corresponding recess. The engagement of the mating member with the corresponding recess may result in an audible click, which notifies the adult vaper that the pod assembly is secured and properly positioned within the through-hole 114 of the dispensing body 104.

In another example, the attachment structure may include a magnetic arrangement. For instance, a first magnet may be arranged in the side wall 116 (of the first frame 110 and/or second frame 112), and a second magnet may be arranged in the side surface of the pod assembly. The first and/or second magnets may be exposed or hidden from view behind a layer of material. The first and second magnets are oriented so as to be attracted to each other, and a plurality of pairs of the first and second magnets may be provided to ensure that the pod assembly will be secure and properly aligned within the through-hole 114 of the dispensing body 104. As a result, when the pod assembly is inserted in the through-hole 114, the pair(s) of magnets (e.g., first and second magnets) will be attracted to each other and, thus, hold the pod assembly within the through-hole 114 while properly aligning the channel outlet of the pod assembly with the vapor passage 106 of the dispensing body 104.

Figure 6:
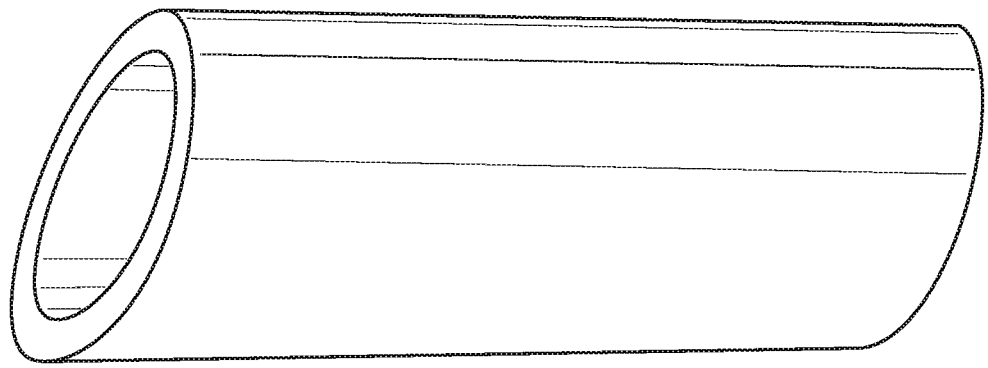
FIG. 6 is a perspective view of the body portion of FIG. 2.
Figure 7:
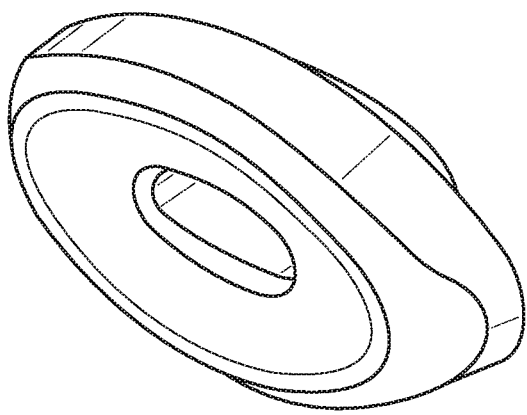
FIG. 7 is a perspective view of the end piece of FIG. 2.

FIG. 6 is a perspective view of the body portion of FIG. 2. Referring to FIG. 6, the body portion 118 may be a tube-like structure that constitutes a substantial segment of the dispensing body 104. The cross-section of the body portion 118 may be oval-shaped, although other shapes are possible depending on the structure of the frame portion. An adult vaper may hold the e-vapor apparatus by the body portion 118. Accordingly, the body portion 118 may be formed of (or covered with) a material that provides enhanced gripping and/or texture appeal to the fingers FIG. 7 is a perspective view of the end piece of FIG. 2. Referring to FIG. 7, the end piece 120 is configured to be inserted in the distal end of the body portion 118. The shape of the end piece 120 may correspond to the shape of the distal end of the body portion 118 so as to provide a relatively smooth and continuous transition between the two surfaces.

Figure 8:
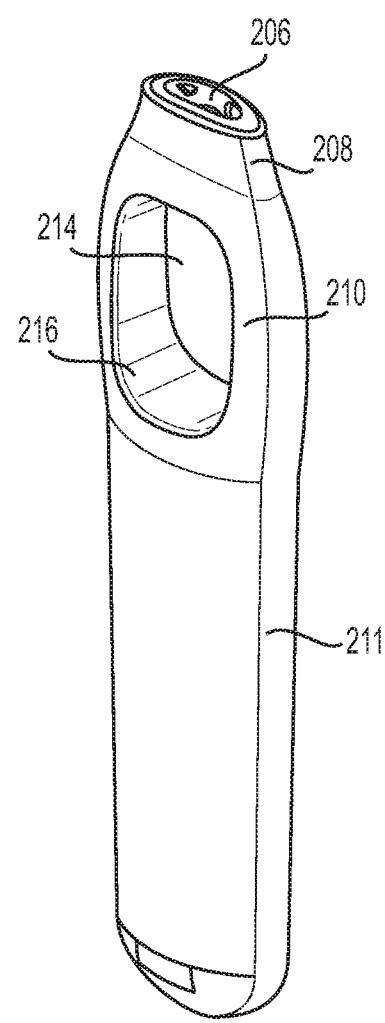
FIG. 8 is a perspective view of another dispensing body of an e-vapor apparatus according to an example embodiment.

FIG. 8 is a perspective view of another dispensing body of an e-vapor apparatus according to an example embodiment. Referring to FIG. 8, the dispensing body 204 includes a side wall 216 defining a through-hole 214 that is configured to receive a pod assembly. A substantial portion of the framework of the dispensing body 204 is provided by the first frame 210, the frame trim 211, and the second frame 212 (e.g., FIG. 9). A vapor passage 206 and a first mouthpiece 208 are provided at a proximal portion of the dispensing body 204.

Figure 9:
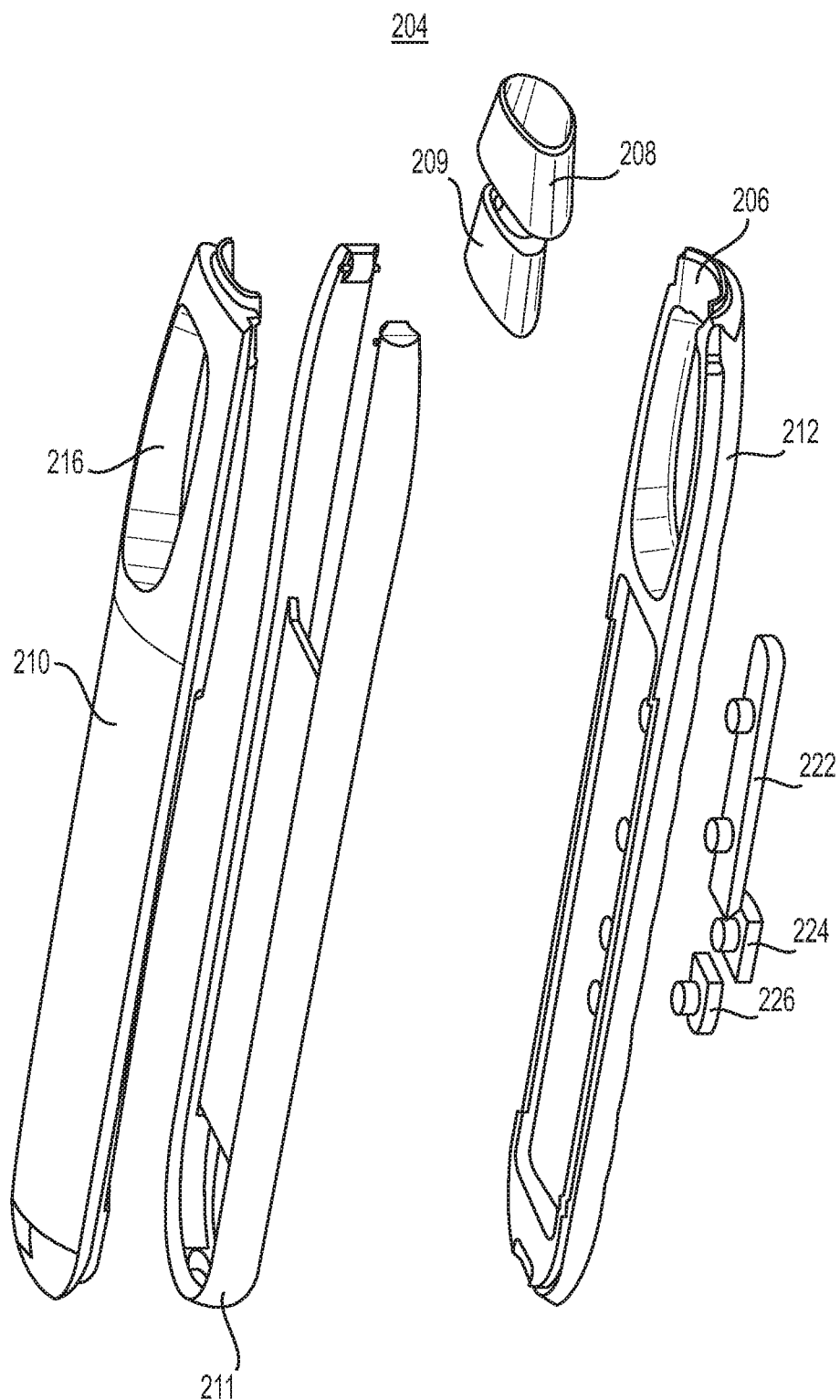
FIG. 9 is an exploded view of the dispensing body of FIG. 8.

FIG. 9 is an exploded view of the dispensing body of FIG. 8. Referring to FIG. 9, the frame trim 211 is sandwiched between the first frame 210 and the second frame 212. However, it should be understood that it is possible to modify and structure the first frame 210 and the second frame 212 such that the frame trim 211 is not needed. The vapor passage 206 may be defined by both the proximal ends of the first frame 210 and the second frame 212 as well as the second mouthpiece 209. As a result, the vapor passage 206 extends from the side wall 216 to the outlet end of the second mouthpiece 209. The first mouthpiece 208 is configured to slip onto the second mouthpiece 209. In an example embodiment, the first mouthpiece 208 may be structured to be removable, while the second mouthpiece 209 may be structured to be permanent. Alternatively, the first mouthpiece 208 may be integrated with the second mouthpiece 209 to form a single structure that is removable.

A first button 222, a second button 224, and a third button 226 may be provided on the second frame 212 of the dispensing body 204. In an example embodiment, the first button 222 may be a display (e.g., battery level indicator), the second button 224 may control an amount of vapor precursor available to the heater, and the third button 226 may be the power button. However, it should be understood that example embodiments are not limited thereto. Notably, the buttons can have different implementations depending on the desired functionalities. Accordingly, a different number of buttons (and/or of different shapes) may be provided in the same proximity or at a different location on the e-vapor apparatus. Furthermore, the features and considerations in connection with the dispensing body 104 that are also applicable to the dispensing body 204 may be as discussed supra in connection with the dispensing body 104.

Figure 10:
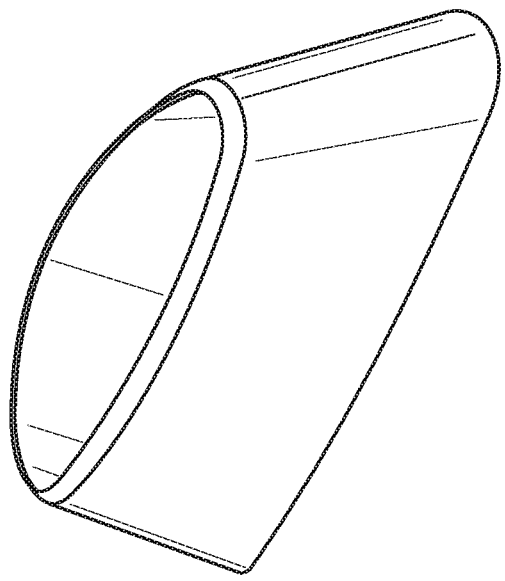
FIG. 10 is a perspective view of the first mouthpiece of FIG. 9.

FIG. 10 is a perspective view of the first mouthpiece of FIG. 9. Referring to FIG. 10, the first mouthpiece 208 is configured to fit over the second mouthpiece 209. Thus, the inner surface of the first mouthpiece 208 may correspond to an outer surface of the second mouthpiece 209.

Figure 11:
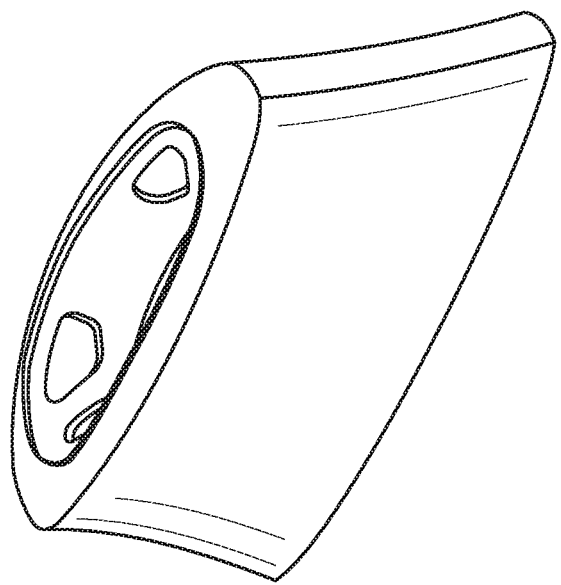
FIG. 11 is a perspective view of the second mouthpiece of FIG. 9.

FIG. 11 is a perspective view of the second mouthpiece of FIG. 9. Referring to FIG. 11, the second mouthpiece 209 defines a vapor passage 206 therein. The second mouthpiece 209 may resemble the combined proximal ends of the first frame 110 and the second frame 112 that define the vapor passage 106 of the dispensing body 104.

Figure 12:
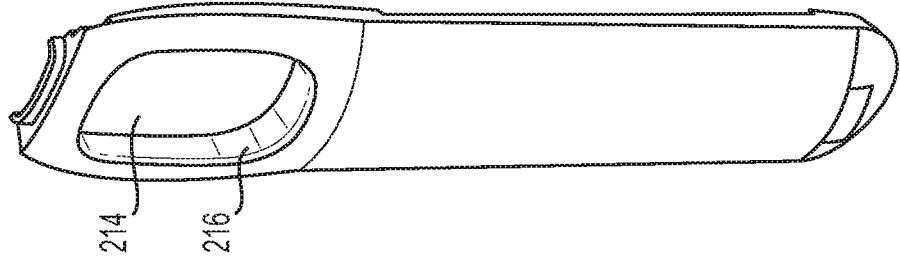
FIG. 12 is a perspective view of the first frame of FIG. 9.

FIG. 12 is a perspective view of the first frame of FIG. 9. Referring to FIG. 12, the first frame 210 includes a side wall 216 that defines a through-hole 214. The top end of the first frame 210 may include a connection structure that facilitates the connection of at least the second mouthpiece 209 thereto.

Figure 13:
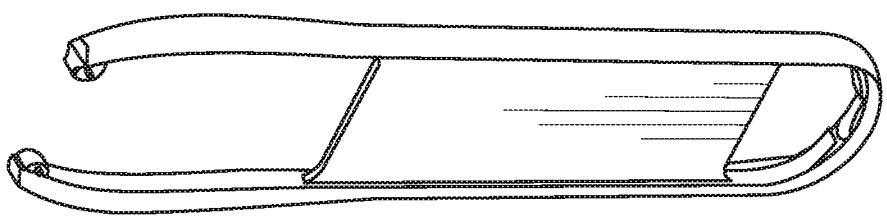
FIG. 13 is a perspective view of the frame trim of FIG. 9.

FIG. 13 is a perspective view of the frame trim of FIG. 9. Referring to FIG. 13, the frame trim 211 may be in the form of a curved strip that is supported by a central plate. When arranged between the first frame 210 and the second frame 212, the frame trim 211 forms a side surface of the dispensing body 204, although example embodiments are not limited thereto.

Figure 14:
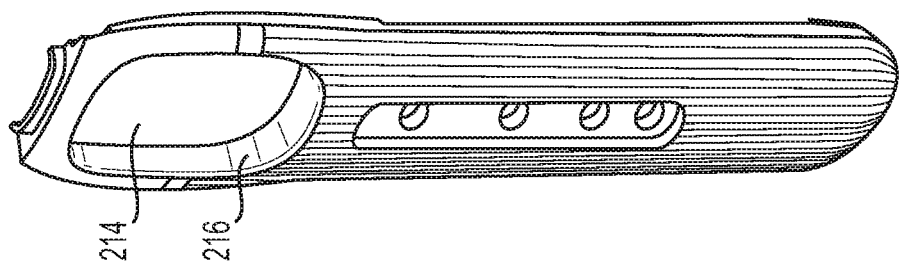
FIG. 14 is a perspective view of the second frame of FIG. 9.

FIG. 14 is a perspective view of the second frame of FIG. 9. Referring to FIG. 14, the second frame 212 includes a side wall 216 that defines a through-hole 214. The top end of the second frame 212 may include a connection structure that facilitates the connection of at least the second mouthpiece 209 thereto. In addition, the surface of the second frame 212 may be provided with a pattern or textured appearance. Such patterning and texturing may be aesthetic (e.g., visually appealing) and/or functional (e.g., enhanced grip) in nature. Although not shown, the surface of the first frame 210 may be similarly provided.

FIG. 15 is a perspective view of a pod assembly of an e-vapor apparatus according to an example embodiment. Referring to FIG. 15, the pod assembly 302 includes a pod trim 310 that is arranged between a first cap 304 and a second cap 314. The first cap 304 may be regarded as a front cap, and the second cap 314 may be regarded as a rear cap (or vice versa). The first cap 304 and the second cap 314 may be formed of a transparent material to permit a viewing of the contents (e.g., vapor precursor) in the pod assembly 302. The pod trim 310 defines a channel outlet 312 for the release of vapor generated within the pod assembly 302.

The pod assembly 302 is a self-contained article that can be sealed with a protective film that wraps around the pod trim 310. Additionally, because of the closed system nature of the pod assembly 302, the risk of tampering and contamination can be reduced. Also, the chance of unwanted physical exposure to the vapor precursor within the pod assembly 302 (e.g., via a leak) can be reduced. Furthermore, the pod assembly 302 can be structured so as to prevent refilling.

FIG. 16 is a top view of the pod assembly of FIG. 15. Referring to FIG. 16, the second cap 314 is wider than the first cap 304. As a result, the pod trim 310 may slant outwards from the first cap 304 to the second cap 314. However, it should be understood that other configurations are possible depending on the design of the pod assembly 302.

FIG. 17 is a side view of the pod assembly of FIG. 15. Referring to FIG. 17, the second cap 314 is longer than the first cap 304. As a result, the pod trim 310 may slant outwards from the first cap 304 to the second cap 314. As a result, the pod assembly 302 may be inserted in a dispensing body such that the side corresponding to the first cap 304 is received in the through-hole first. In an example embodiment, the pod assembly 302 may be inserted in the through-hole 114 of the dispensing body 104 and/or the through-hole 214 of the dispensing body 204.

Figure 18:
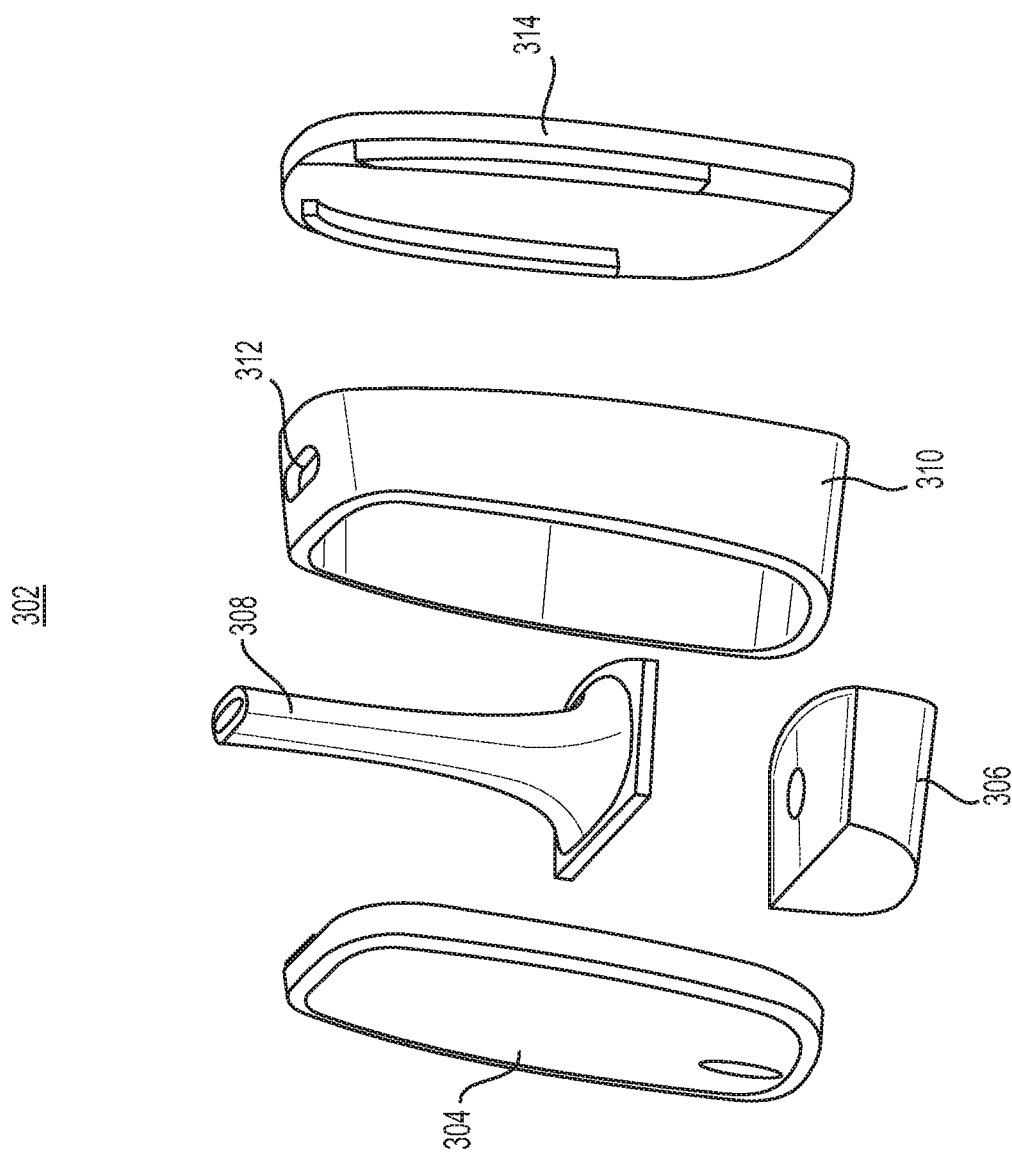
FIG. 18 is an exploded view of the pod assembly of FIG. 15.

FIG. 18 is an exploded view of the pod assembly of FIG. 15. Referring to FIG. 18, the internal space of the pod assembly 302 may be divided into a plurality of compartments by virtue of the components therein. For instance, the tapered outlet of the vapor channel 308 may be aligned with the channel outlet 312, and the space bounded by the first cap 304, the vapor channel 308, the pod trim 310, and the second cap 314 may be regarded as the vapor precursor compartment. Additionally, the bounded space under the vapor channel 308 may be regarded as the device compartment. For instance, the device compartment may include the vaporizer 306. One benefit of including the vaporizer 306 in the pod assembly 302 is that the vaporizer 306 will only be used for the amount of vapor precursor contained within the vapor precursor compartment and, thus, will not be overused.

Figure 19:
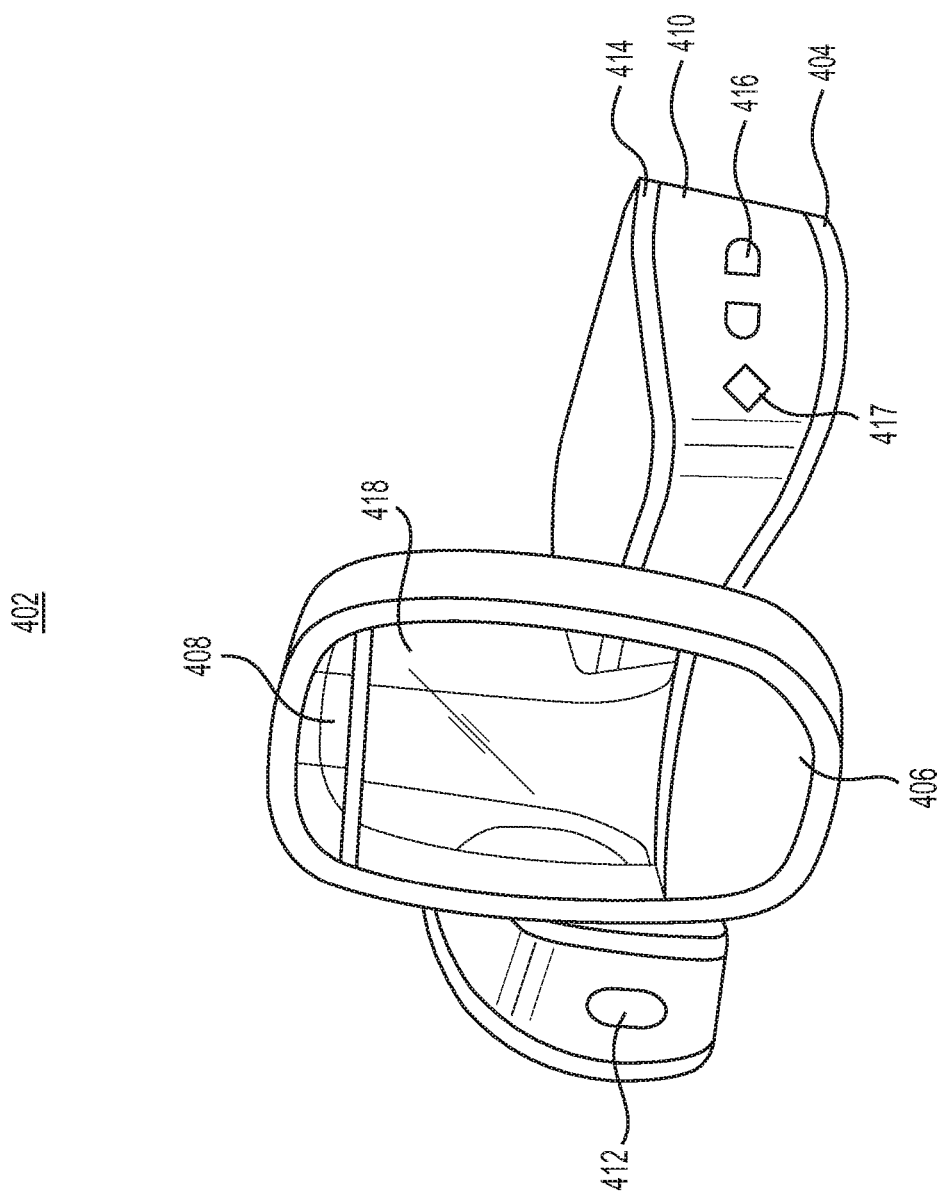
FIG. 19 a perspective view of several pod assemblies according to an example embodiment.

FIG. 19 a perspective view of several pod assemblies according to an example embodiment. Referring to FIG. 19, each of the pod assemblies 402 includes a pod trim 410 arranged between a first cap 404 and a second cap 414. The vapor channel 408 is aligned with the channel outlet 412 and arranged above the vaporizer 406. The pod assembly 402 is sealed to hold a vapor precursor 418 therein and to preclude tampering therewith. The vapor precursor compartment of the pod assembly 402 is configured to hold the vapor precursor 418, and the device compartment includes the vaporizer 406.

In further detail, the pod assembly 402 for an e-vapor apparatus may include a vapor precursor compartment configured to hold a vapor precursor 418 therein. A device compartment is in fluidic communication with the vapor precursor compartment. The device compartment includes a vaporizer 406. A vapor channel 408 extends from the device compartment and traverses the vapor precursor compartment.

The pod assembly 402 is configured for insertion into a dispensing body. As a result, the dimensions of the pod assembly 402 may correspond to the dimensions of the through-hole (e.g., 114) of the dispensing body (e.g., 104). The vapor channel 408 may be between the mouthpiece (e.g., 108) and the device compartment when the pod assembly 402 is inserted into the through-hole of the dispensing body.

An attachment structure (e.g., male/female member arrangement, magnetic arrangement) may be provided on at least one of the side wall (e.g., 116) of the through-hole (e.g., 114) and a side surface of the pod assembly 402. The attachment structure may be configured to engage and hold the pod assembly 402 upon insertion into the through-hole of the dispensing body. In addition, the channel outlet 412 may be utilized to secure the pod assembly 402 within the through-hole of the dispensing body. For instance, the dispensing body may be provided with a retractable vapor connector that is configured to insert into the channel outlet 412 so as to secure the pod assembly 402 while also supplementing the vapor path from the channel outlet 412 to the vapor passage (e.g., 106) of the dispensing body (e.g., 104). The vapor connector may also be a rounded structure and/or spring-loaded to facilitate its retraction (e.g., via spring compression) and protraction (e.g., via spring decompression).

In an example embodiment, the vapor precursor compartment of the pod assembly 402 may surround the vapor channel 408. For instance, the vapor channel 408 may pass through a center of the vapor precursor compartment, although example embodiments are not limited thereto.

Alternatively, instead of the vapor channel 408 shown in FIG. 19, a vapor channel may be in a form of a pathway that is arranged along at least one sidewall of the precursor compartment. For example, a vapor channel may be provided in a form of a pathway that spans between the first cap 404 and the second cap 414 while extending along one or both sides of an inner surface of the pod trim 410. As a result, the pathway may have a thin, rectangular cross-section, although example embodiments are not limited thereto. When the pathway is arranged along two sidewalls of the vapor precursor compartment (e.g., both inner sidewalls of the pod trim 410), the pathway along each sidewall may be configured to converge at a position (e.g., channel outlet 412) that is aligned with the vapor passage (e.g., 106) of the dispensing body (e.g., 104) when the pod assembly 402 is received in the through-hole 114.

In another instance, the vapor channel may be in a form of a conduit that is arranged in at least one corner of the vapor precursor compartment. Such a corner may be at the interface of the first cap 404 and/or the second cap 414 with the inner surface of the pod trim 410. As a result, the conduit may have a triangular cross-section, although example embodiments are not limited thereto. When the conduit is arranged in at least two corners (e.g., front corners, rear corners, diagonal corners, side corners) of the vapor precursor compartment, the conduit in each corner may be configured to converge at a position (e.g., channel outlet 412) that is aligned with the vapor passage (e.g., 106) of the dispensing body (e.g., 104) when the pod assembly 402 is received in the through-hole 114.

The vapor precursor compartment and the device compartment may be at opposite ends of the pod assembly 402. The device compartment may include a memory device. The memory device may be coded with an electronic identity to permit at least one of an authentication of the pod assembly 402 and a pairing of operating parameters specific to a type of the pod assembly 402 when the pod assembly 402 is inserted into the through-hole of the dispensing body (e.g., smart calibration). The electronic identity may help prevent counterfeiting. The operating parameters may help optimize a vaping experience without placing a burden on the adult vaper to determine the proper settings. In an example embodiment, the level of vapor precursor in the pod assembly 402 may be tracked. Additionally, the activation of the pod assembly 402 may be restricted once its intended usage life has been exceeded. Thus, the pod assembly 402 (and 302) may be regarded as a smart pod.

A side surface of the pod assembly 402 includes at least one electrical contact 416 and/or data connection 417 (e.g., two or three electrical contacts and/or data connections). The dispensing body may be configured to perform at least one of supply power to and communicate with the pod assembly 402 via the at least one electrical contact 416. The at least one electrical contact 416 may be provided at an end of the pod assembly 402 corresponding to the device compartment. Because of its smart capability, the pod assembly 402 may communicate with dispensing body and/or another electronic device (e.g., smart phone). As a result, usage patterns and other information (e.g., flavor intensity, throat feel, puff count) may be generated, stored, transferred, and/or displayed. The smart capability, connecting features, and other related aspects of the pod assembly, dispensing body, and overall e-vapor apparatus are additionally discussed in U.S. Application No. 62/151,160), U.S. Application No. 62/151,179), and U.S. Application No. 62/151,248), the entire contents of each of which are incorporated herein by reference.

Figure 20:
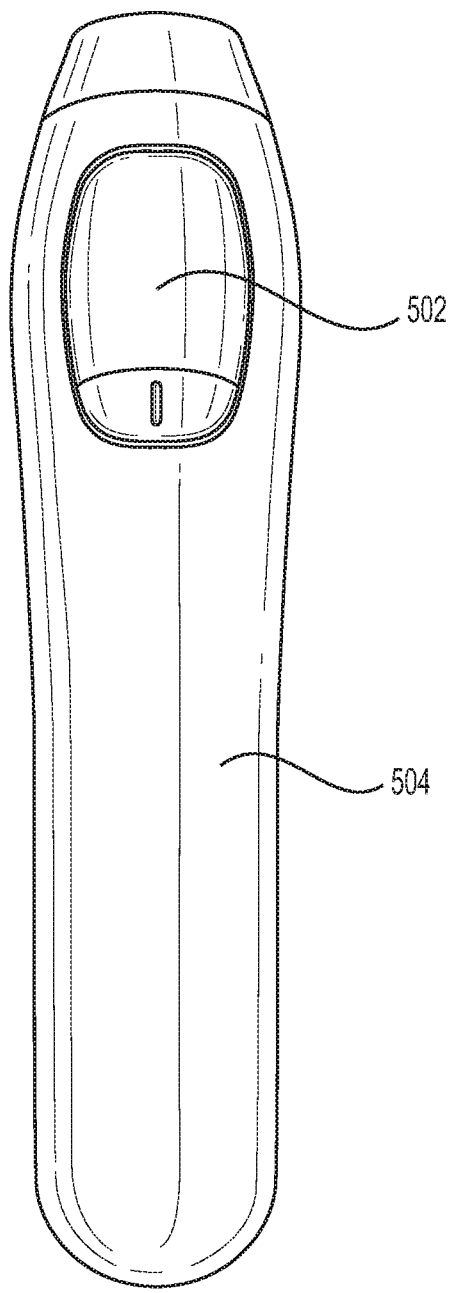
FIG. 20 is a view of an e-vapor apparatus with a pod assembly inserted in a dispensing body according to an example embodiment.

FIG. 20 is a view of an e-vapor apparatus with a pod assembly inserted in a dispensing body according to an example embodiment. Referring to FIG. 20, an e-vapor apparatus 500 includes a pod assembly 502 (e.g., smart pod) that is inserted within a dispensing body 504. The pod assembly 502 may be as previously described in connection with the pod assembly 302 and the pod assembly 402. As a result, the pod assembly 502 may be a hassle-free and leak-free component that can be replaced with relative ease when the vapor precursor therein runs low/out or when another flavor is desired.

Figure 21:
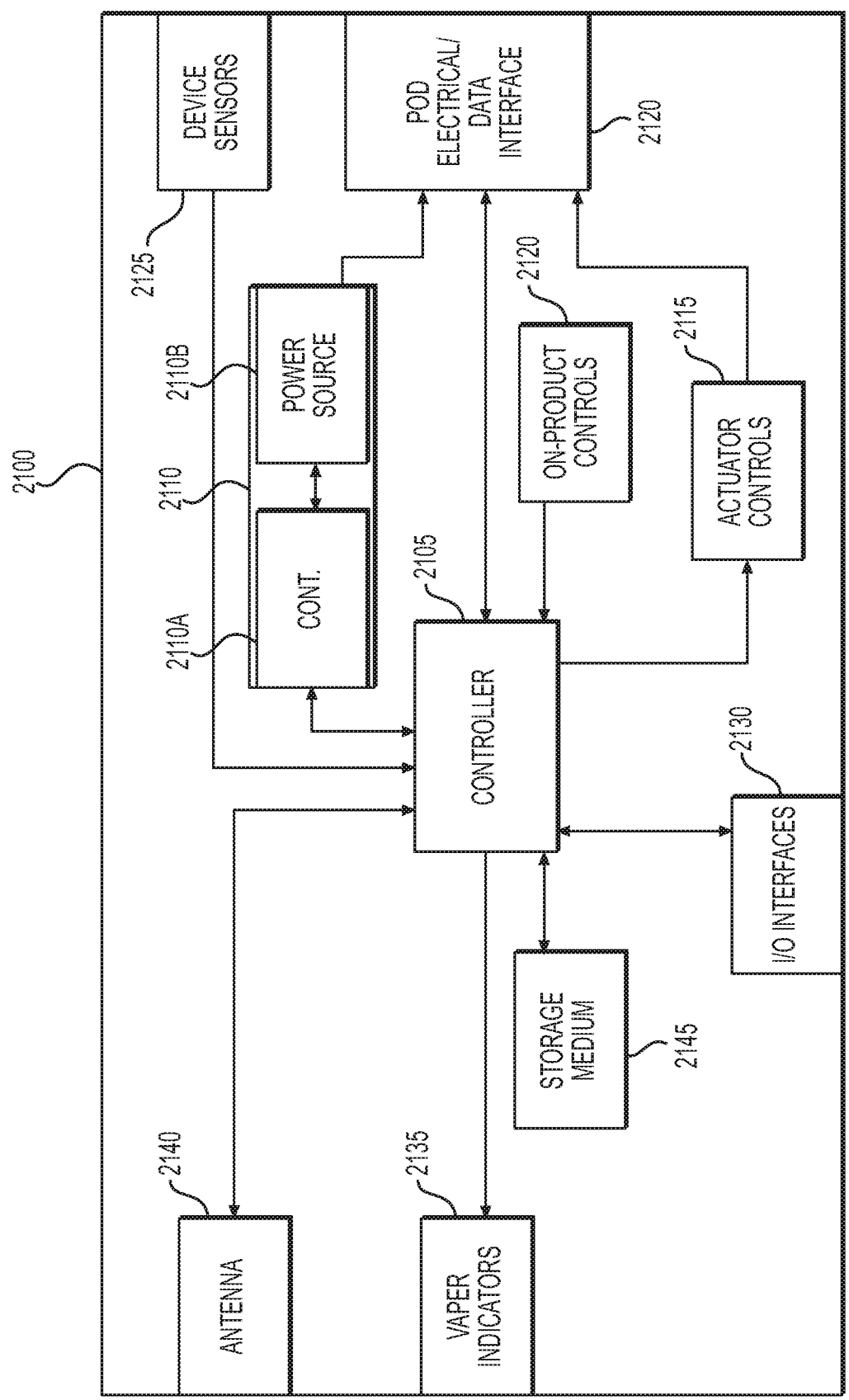
FIG. 21 illustrates a device system diagram of a dispensing body according to an example embodiment.

FIG. 21 illustrates a device system of a dispensing body according to an example embodiment. A device system 2100 may be the system within the dispensing body 104 and the dispensing body 204.

The device system 2100 includes a controller 2105, a power supply 2110, actuator controls 2115, a pod electrical/data interface 2120, device sensors 2125, input/output (I/O) interfaces 2130, vaper indicators 2135, at least one antenna 2140 and a storage medium 2145. The device system 2100 is not limited to the features shown in FIG. 21. For example, the device system 2100 may include additional components. However, for the sake of brevity, the additional components are not described.

The controller 2105 may be hardware, firmware, hardware executing software or any combination thereof. When the controller 2105 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the processor 220. As stated above, CPUs, DSPs, ASICs and FPGAs may generally be referred to as processing devices.

In the event where the controller 2105 is a processor executing software, the controller 2105 is configured as a special purpose machine to execute the software, stored in the storage medium 2145, to perform the functions of the at least one of the controller 2105.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Referring to FIG. 21, the controller 2105 communicates with the power supply 2110, the actuator control 2115, the pod electrical/data interface 2120, the device sensors 2125, the input/output (I/O) interfaces 2130, the vaper indicators 2135, the at least one antenna 2140.

The controller 2105 communicates with the CC-NVM in the pod through the pod electrical/data interface 2120. More specifically, the controller 2105 may utilize encryption to authenticate the pod. As will be described, the controller 2105 communicates with the CC-NVM package to authenticate the pod. More specifically, the non-volatile memory is encoded during manufacture with product and other information for authentication.

The memory device may be coded with an electronic identity to permit at least one of an authentication of the pod and a pairing of operating parameters specific to a type of the pod when the pod assembly 402 is inserted into the through-hole of the dispensing body. In addition to authenticating based on an electronic identity of the pod, the controller 2105 may authorize use of the pod based on an expiration date of the stored vapor precursor and/or heater encoded into the non-volatile memory of the CC-NVM. If the controller determines that the expiration date encoded into the non-volatile memory has passed, the controller may not authorize use of the pod and disable the e-vaping device.

The controller 2105 (or storage medium 2145) stores key material and proprietary algorithm software for the encryption. For example, encryption algorithms rely on the use of random numbers. The security of these algorithms depends on how truly random these numbers are. These numbers are usually pre-generated and coded into the processor or memory devices. Example embodiments may increase the randomness of the numbers used for the encryption by using the puffing parameters e.g. puff durations, intervals between puffs, or combinations of them, to generate numbers that are more random and more varying from individual to individual than pre-generated random numbers. All communications between the controller 2105 and the pod may be encrypted.

Moreover, the pod can be used to as a general pay-load carrier for other information such as software patches for the e-vaping device. Since encryption is used in all the communications between the pod and the controller 2105, such information is more secure and the e-vaping device is less prone to being installed with malwares or viruses. Use of the CC-NVM as an information carrier such as data and software updates allows the e-vaping device to be updated with software without it being connected to the Internet and for the adult vaper to go through a downloading process as with most other consumer electronics devices requiring periodic software updates.

The controller 2105 may also include a cryptographic accelerator to allow resources of the controller 2105 to perform functions other than the encoding and decoding involved with the authentication. The controller 2105 may also include other security features such as preventing unauthorized use of communication channels and preventing unauthorized access to data if a pod or vaper is not authenticated.

In addition to a cryptographic accelerator, the controller 2105 may include other hardware accelerators. For example, the controller 2105 may include a floating point unit (FPU), a separate DSP core, digital filters and Fast Fourier Transform (FFT) modules.

The controller 2105 operates a real time operating system (RTOS), controls the device system 2100 and may be updated through communicating with the CC-NVM or when the device system 2100 is connected with other devices (e.g., a smart phone) through the I/O interfaces 2130 and/or the antenna 2140. The I/O interfaces 2130 and the antenna 2140 allow the device system 2100 to connect to various external devices such as smart phones, tablets, and PCs. For example, the I/O interfaces 2130 may include a micro-USB connector. The micro-USB connector may be used by the device system 2100 to charge the power source 2110*b*.

The controller 2105 may include on-board RAM and flash memory to store and execute code including analytics, diagnostics and software upgrades. As an alternative, the storage medium 2145 may store the code. Additionally, in another example embodiment, the storage medium 2145 may be on-board the controller 2105.

The controller 2105 may further include on-board clock, reset and power management modules to reduce an area covered by a PCB in the dispensing body.

The device sensors 2125 may include a number of sensor transducers that provide measurement information to the controller 2105. The device sensors 2125 may include a power supply temperature sensor, an external pod temperature sensor, a current sensor for the heater, power supply current sensor, air flow sensor and an accelerometer to monitor movement and orientation. The power supply temperature sensor and external pod temperature sensor may be a thermistor or thermocouple and the current sensor for the heater and power supply current sensor may be a resistive based sensor or another type of sensor configured to measure current. The air flow sensor may be a microelectromechanical system (MEMS) flow sensor or another type of sensor configured to measure air flow.

The data generated from the number of sensor transducers may be sampled at a sample rate appropriate to the parameter being measured using a discrete, multi-channel analog-to-digital converter (ADC).

The controller 2105 may adapt heater profiles for a vapor precursor and other profiles based on the measurement information received from the controller 2105. For the sake of convenience, these are generally referred to as vaping or vapor profiles.

The heater profile identifies the power profile to be supplied to the heater during the few seconds when puffing takes place. For example of a heater profile can be: deliver maximum power to the heater when a puff is initiated, but then after a second or so immediately reduce the power to half way or a quarter way or so.

The modulation of electrical power is usually implemented using pulse wave modulation—instead of flipping an on/off switch where the power is either full on or off.

In addition, a heater profile can also be modified by the extent to which the adult vaper applies negative pressure to the e-vaping device. The use of the MEMS flow sensor allows puff strength to be measured and used as feedback to the controller 2105 to adjust the power delivered to the heater of the pod, which may be referred to as heating or energy delivery.

When the controller 2105 recognizes the pod currently installed (e.g., via SKU), the controller 2105 matches an associated heating profile that is designed for that particular pod. The controller 2105 and the storage medium 2145 will store data and algorithms that allow the generation of heating profiles for all SKUs. The adult vapers may also adjust heating profiles to suit their preferences.

As shown in FIG. 21, the controller 2105 sends data to and receives data from the power supply 2110. The power supply 2110 includes a power source 2110*b* and a power controller 2110*a* to manage the power output by the power source 2110*b*.

The power source 2110*b* may be a Lithium-ion battery or one of its variants, for example a Lithium-ion polymer battery. Alternatively, the power source 2110b may be a Nickel-metal hydride battery, a Nickel cadmium battery, a Lithium-manganese battery, a Lithium-cobalt battery or a fuel cell. Alternatively, the power source 2110b may be rechargeable and include circuitry allowing the battery to be chargeable by an external charging device. In that case, the circuitry, when charged, provides power for a desired (or alternatively a pre-determined) number of puffs, after which the circuitry must be re-connected to an external charging device.

The power controller 2110a provides commands to the power source 2110b based on instructions from the controller 2105. For example, the power supply 2110 may receive a command from the controller 2105 to provide power to the pod (through the electrical/data interface 2120) when the pod is authenticated and the adult vaper activates the device system 2100 (e.g., by activating a switch such as a toggle button, capacitive sensor, IR sensor). When the pod is not authenticated, the controller 2105 may either send no command to the power supply 2110 or send an instruction to the power supply 2110 to not provide power. In another example embodiment, the controller 2105 may disable all operations of the device system 2100 if the pod is not authenticated.

In addition to supplying power to the pod, the power supply 2110 also supplies power to the controller 2105. Moreover, the power controller 2110a may provide feedback to the controller 2105 indicating performance of the power source 2110b.

The controller 2105 sends data to and receives data from the at least one antenna 2140. The at least one antenna 2140 may include a Near Field Communication (NFC) modem and a Bluetooth Low Energy (LE) modem and/or other modems for other wireless technologies (e.g., Wi-Fi). In an example embodiment, the communications stacks are in the modems, but the modems are controlled by the controller 2105. The Bluetooth LE modem is used for data and control communications with an application on an external device (e.g., smart phone). The NFC modem may be used for pairing of the e-vaping device to the application and retrieval of diagnostic information. Moreover, the NFC modem may be used to provide location information (for an adult vaper to find the e-vaping device) or authentication during a purchase.

As described above, the device system 2100 may generate and adjust various profiles for vaping. The controller 2105 uses the power supply 2110 and the actuator controls 2115 to regulate the profile for the adult vaper.

The actuator controls 2115 include passive and active actuators to regulate a desired vapor profile. For example, the dispensing body may include an inlet channel within a mouthpiece. The actuator controls 2115 may control the inlet channel based on commands from the controller 2105 associated with the desired vapor profile.

Moreover, the actuator controls 2115 are used to energize the heater in conjunction with the power supply 2110. More specifically, the actuator controls 2115 are configured to generate a drive waveform associated with the desired vaping profile. As described above, each possible profile is associated with a drive waveform. Upon receiving a command from the controller 2105 indicating the desired vaping profile, the actuator controls 2115 may produce the associated modulating waveform for the power supply 2110.

The controller 2105 supplies information to the vaper indicators 2135 to indicate statuses and occurring operations to the adult vaper. The vaper indicators 2135 include a power indicator (e.g., LED) that may be activated when the controller 2105 senses a button press by the adult vaper. The vaper indicators 2135 may also include a vibrator, speaker, an indicator for current state of a vaper-controlled vaping parameter (e.g., vapor volume) and other feedback mechanisms.

Furthermore, the device system 2100 may include a number of on-product controls 2150 that provide commands from an adult vaper to the controller 2105. The on-product controls 2150 include an on-off button which may be a toggle button, capacitive sensor or IR sensor, for example. The on-product controls 2150 may further include a vaping control button (if the adult vaper desires to override the buttonless vaping feature to energize the heater), a hard reset button, a touch based slider control (for controlling setting of a vaping parameter such as puff volume), a vaping control button to activate the slider control and a mechanical adjustment for an air inlet.

Once a pod is authenticated, the controller 2105 operates the power supply 2110, the actuator controls 2115, vaper indicators 2135 and antenna 2140 in accordance with an adult vaper using the e-vaping device and the information stored by the CC-NVM on the pod. Moreover, the controller 2105 may include logging functions and be able to implement algorithms to calibrate the e-vaping device. The logging functions are executed by the controller 2105 to record usage data as well any unexpected events or faults. The recorded usage data may be used for diagnostics and analytics. The controller 2105 may calibrate the e-vaping device using buttonless vaping, a vaper configuration and the stored information on the CC-NVM including puff sensing, vapor precursor level, and vapor precursor composition. For example, the controller 2105 may command the power supply 2110 to supply power to the heater in the pod based on a vaping profile associated with the vapor precursor composition in the pod. Alternatively, a vaping profile may be encoded in the CC-NVM and utilized by the controller 2105.

Figure 22:
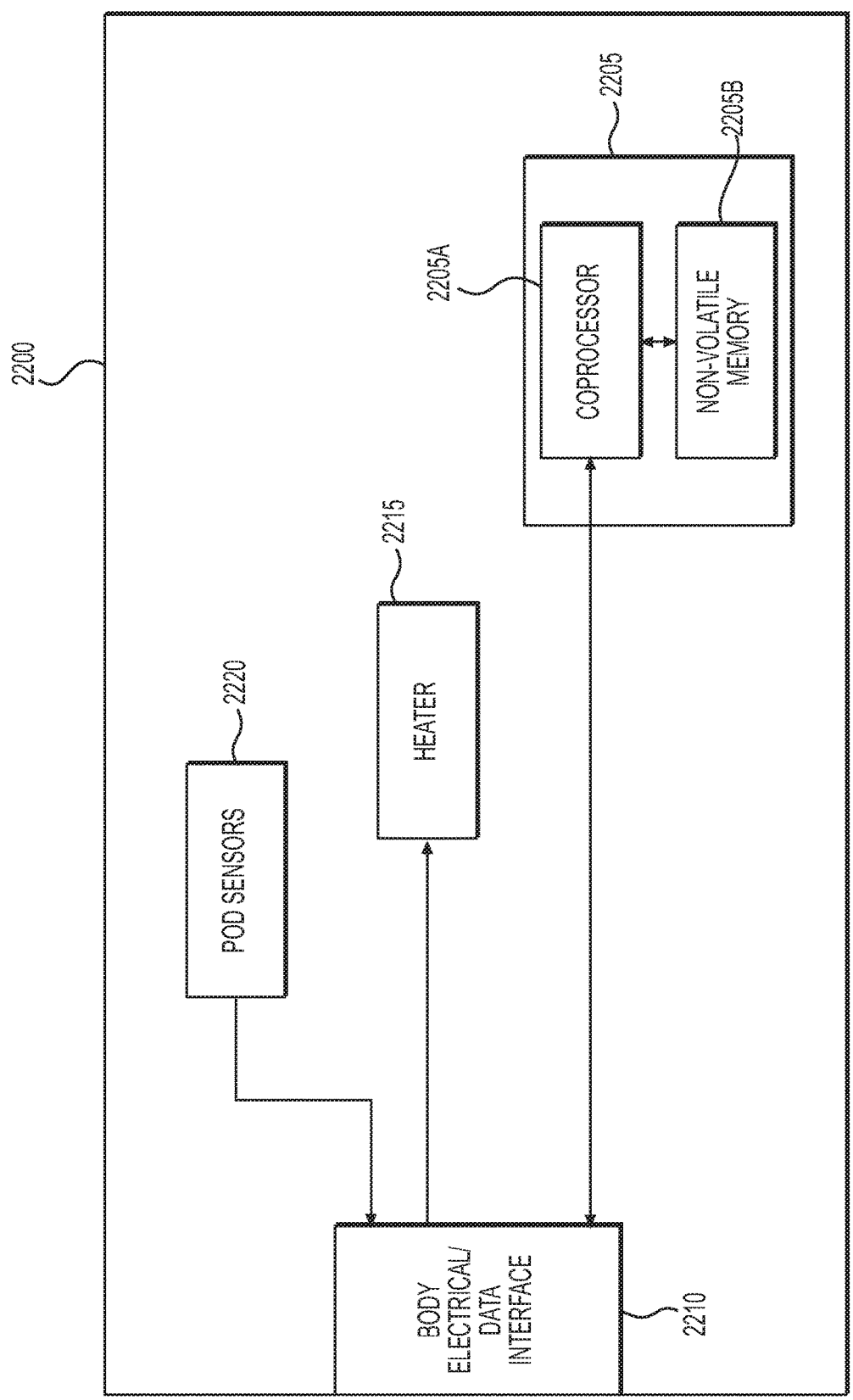
FIG. 22 illustrates a pod system diagram of a dispensing body according to an example embodiment.

FIG. 22 illustrates a pod system diagram of a dispensing body according to an example embodiment. A pod system 2200 may be within the pod assembly 502, the pod assembly 302 and the pod assembly 402.

As shown in FIG. 22, the pod system 2200 includes a CC-NVM 2205, a body electrical/data interface 2210, a heater 2215 and pod sensors 2220. The pod system 2200 communicates with the device system 2100 through the body electrical/data interface 2210 and the pod electrical/data interface 2120. The body electrical/data interface 2210 may correspond to the battery contacts 416 and data connection 417 connected within the pod assembly 402, shown in FIG. 19, for example. Thus, the CC-NVM 2205 is coupled to the data connection 417 and the battery contacts 416.

The CC-NVM 2205 includes a cryptographic coprocessor 2205a and a non-volatile memory 2205b. The controller 2105 may access the information stored on the non-volatile memory 2205b for the purposes of authentication and operating the pod by communicating with the cryptographic coprocessor 2205a.

The non-volatile memory 2205b may be coded with an electronic identity to permit at least one of an authentication of the pod and a pairing of operating parameters specific to a type of the pod when the pod assembly is inserted into the through-hole of the dispensing body. In addition to authenticating based on an electronic identity of the pod, the controller 2105 may authorize use of the pod based on an expiration date of the stored vapor precursor and/or heater encoded into the non-volatile memory 2205b of the CC-NVM. If the controller determines that the expiration date encoded into the non-volatile memory 2205b has passed, the controller may not authorize use of the pod and disable the e-vaping device.

Moreover, the non-volatile memory 2205b may store information such as a stock keeping unit (SKU) of the vapor precursor in the vapor precursor compartment (including vapor precursor composition), software patches for the device system 2100, product usage information such as puff count, puff duration, and vapor precursor level. The non-volatile memory 2205b may store operating parameters specific to the type of the pod and the vapor precursor composition. For example, the non-volatile memory 2205b may store the electrical and mechanical design of the pod for use by the controller 2105 to determine commands corresponding to a desired vaping profile.

The vapor precursor level in the pod may be determined in one of two ways, for example. In one example embodiment, one of the pod sensors 2220 directly measures the vapor precursor level in the pod.

In another example embodiment, the non-volatile memory 2205b stores the number of puffs taken from the pod and the controller 2105 uses the number of puffs taken as a proxy to the amount of vapor precursor that is vaporized.

The controller 2105 and/or the storage medium 2145 may store vapor precursor calibration data that identifies an operating point for the vapor precursor composition. The vapor precursor calibration data include data describing how flow rate changes with a remaining vapor precursor level or how volatility changes with an age of the vapor precursor and may be used for calibration by the controller 2105. The vapor precursor calibration data may be stored by the controller 2105 and/or the storage medium 2145 in a table format. The vapor precursor calibration data allows the controller 2105 to equate the number of puffs taken to the amount of vapor precursor that is vaporized.

The controller 2105 writes the vapor precursor level and number of puffs taken back to the non-volatile memory 2205b in the pod so if the pod is removed from the dispensing body and later on re-installed, an accurate vapor precursor level of the pod will still be known by the controller 2105.

The operating parameters (e.g., power supply, power duration, air channel control) are referred to as a vaping profile. Moreover, the non-volatile memory 2205b may record information communicated by the controller 2105. The non-volatile memory 2205b may retain the recorded information even when the dispensing body becomes disconnected from the pod.

In an example embodiment, the non-volatile memory 2205b may be a programmable read only memory.

The heater 2215 is actuated by the controller 2105 and transfers heat to the vapor precursor in accordance with the commanded profile (volume, temperature (based on power profile) and flavor) from the controller 2105.

The heater 2215 may be a wire coil surrounding a wick, a mesh, a surface or made out of a ceramic material for example. Examples of suitable electrically resistive materials include titanium, zirconium, tantalum and metals from the platinum group. Examples of suitable metal alloys include stainless steel, nickel-, cobalt-, chromium-, aluminum-titanium-zirconium-, hafnium-, niobium-, molybdenum-, tantalum-, tungsten-, tin-, gallium-, manganese- and iron-containing alloys, and super-alloys based on nickel, iron, cobalt, stainless steel. For example, the heater may be formed of nickel aluminides, a material with a layer of alumina on the surface, iron aluminides and other composite materials, the electrically resistive material may optionally be embedded in, encapsulated or coated with an insulating material or vice-versa, depending on the kinetics of energy transfer and the external physicochemical properties required. In one embodiment, the heater comprises at least one material selected from the group consisting of stainless steel, copper, copper alloys, nickel-chromium alloys, super-alloys and combinations thereof. In an embodiment, the heater 2215 is formed of nickel-chromium alloys or iron-chromium alloys. In one embodiment, the heater 2215 can be a ceramic heater having an electrically resistive layer on an outside surface thereof.

In another embodiment, the heater 2215 may be constructed of an iron-aluminide (e.g., FeAl or $Fe_3Al$), such as those described in commonly owned U.S. Pat. No. 5,595,706 to Sikka et al. filed Dec. 29, 1994, or nickel aluminides (e.g., $Ni_3Al$), the entire contents of which are hereby incorporate by reference.

The heater 2215 may determine an amount of vapor precursor to heat based on feedback from the pod sensors or the controller 2105. The flow of vapor precursor may be regulated by a micro-capillary or wicking action. Moreover, the controller 2105 may send commands to the heater 2215 to adjust an air inlet to the heater 2215.

The pod sensor 2220 may include a heater temperature sensor, vapor precursor flow rate monitor and air flow monitor. The heater temperature sensor may be a thermistor or thermocouple and the flow rate sensing may be performed by the pod system 2200 using electrostatic interference or an in-liquid rotator. The air flow sensor may be a microelectromechanical system (MEMS) flow sensor or another type of sensor configured to measure air flow.

The data generated from the pod sensors 2220 may be sampled at a sample rate appropriate to the parameter being measured using a discrete, multi-channel analog-to-digital converter (ADC).

While a number of example embodiments have been disclosed herein, it should be understood that other variations may be possible. Such variations are not to be regarded as a departure from the spirit and scope of the present disclosure, and all such modifications as would be obvious to one skilled in the art are intended to be included within the scope of the following claims.

The invention claimed is:

1. A pod assembly for an e-vapor apparatus, comprising:
   a plurality of external surfaces including a front face, a rear face, a first side face, a second side face, a downstream end face, and an upstream end face, a portion of at least the front face or the rear face being transparent, the downstream end face defining an outlet;
   a liquid compartment configured to hold a liquid formulation such that the liquid formulation is visible through at least the front face or the rear face;
   a vaporizer compartment in fluidic communication with the liquid compartment, the vaporizer compartment including a heater and a wick;
   a vapor channel surrounded by the liquid compartment, the vapor channel being visible through at least the front face or the rear face; and
   a plurality of electrical contacts having respective planar surfaces at the upstream end face, the vapor channel being between the outlet and the plurality of electrical contacts.

2. The pod assembly of claim 1, wherein a width of a downstream section of the vapor channel is less than a width of a corresponding section of the liquid compartment based on a side view, the downstream section being closer to the downstream end face than the upstream end face.

3. The pod assembly of claim 2, wherein the downstream section of the vapor channel is closer to the front face and the rear face than to the first side face and the second side face.

4. The pod assembly of claim 1, wherein at least the first side face or the second side face defines a recess configured for engagement as part of an attachment structure.

5. The pod assembly of claim 1, wherein the vapor channel and at least a portion of the liquid formulation in the liquid compartment is between the downstream end face and the vaporizer compartment.

6. The pod assembly of claim 1, wherein the heater includes a wire coil formed of a nickel-chromium alloy.

7. The pod assembly of claim 1, wherein the vaporizer compartment is visible through at least the front face or the rear face.

8. The pod assembly of claim 1, wherein an entirety of the vapor channel is downstream from the heater.

9. The pod assembly of claim 1, wherein the plurality of electrical contacts include a first electrical contact and a second electrical contact, the first electrical contact being closer to the first side face than the second side face, the second electrical contact being closer to the second side face than the first side face.

10. An e-vapor apparatus comprising:
a pod assembly including a plurality of external surfaces, a liquid compartment, a vaporizer compartment, and a vapor channel, the plurality of external surfaces including a front face, a rear face, a first side face, a second side face, a downstream end face, and an upstream end face, a portion of at least the front face or the rear face being transparent, the liquid compartment configured to hold a liquid formulation such that the liquid formulation is visible through at least the front face or the rear face, the vapor channel surrounded by the liquid compartment, the vapor channel being visible through at least the front face or the rear face; and
a device body including a magnet and defining a pod compartment configured to receive the pod assembly so as to produce an audible click.

11. The e-vapor apparatus of claim 10, wherein the vaporizer compartment is adjacent to the upstream end face of the pod assembly.

12. The e-vapor apparatus of claim 10, wherein the vaporizer compartment includes a heater and a wick.

13. The e-vapor apparatus of claim 10, wherein the vapor channel extends from the vaporizer compartment and through a center of the liquid compartment.

14. The e-vapor apparatus of claim 10, wherein the vapor channel of the pod assembly coincides with a central longitudinal axis of the device body.

15. The e-vapor apparatus of claim 10, wherein the pod compartment of the device body has a first compartment side wall, a second compartment side wall, a third compartment side wall, and a fourth compartment side wall.

16. The e-vapor apparatus of claim 15, wherein at least the first compartment side wall or the second compartment side wall of the device body includes a mating member.

17. The e-vapor apparatus of claim 16, wherein at least the first side face or the second side face of the pod assembly defines a recess configured to engage with the mating member of the device body as part of an attachment structure for securing the pod assembly to the device body.

18. The e-vapor apparatus of claim 17, wherein the recess is configured to engage with the mating member so as to produce the audible click.

* * * * *